United States Patent
Li

(10) Patent No.: US 9,453,602 B2
(45) Date of Patent: Sep. 27, 2016

(54) POSITIVE SEAL COUPLING SYSTEM

(71) Applicant: Marubeni-Itochu Tubulars America Inc., Houston, TX (US)

(72) Inventor: Jianmin Li, Palmetto Bay, FL (US)

(73) Assignee: MARUBENI-ITOCHU TUBULARS AMERICA INC., Houston, TX (US)

( * ) Notice: Subject to any disclaimer, the term of this patent is extended or adjusted under 35 U.S.C. 154(b) by 0 days.

(21) Appl. No.: 14/515,278

(22) Filed: Oct. 15, 2014

(65) Prior Publication Data

US 2015/0047176 A1    Feb. 19, 2015

Related U.S. Application Data

(63) Continuation of application No. 14/255,731, filed on Apr. 17, 2014, now abandoned.

(60) Provisional application No. 61/813,470, filed on Apr. 18, 2013.

(51) Int. Cl.
| | |
|---|---|
| B23P 19/04 | (2006.01) |
| F16L 37/10 | (2006.01) |
| F16L 21/02 | (2006.01) |
| F16L 21/08 | (2006.01) |
| F16L 1/10 | (2006.01) |
| F16L 33/22 | (2006.01) |

(52) U.S. Cl.
CPC ........... F16L 37/105 (2013.01); F16L 1/10 (2013.01); F16L 21/022 (2013.01); F16L 21/08 (2013.01); F16L 33/224 (2013.01); *Y10T 29/49826* (2015.01); *Y10T 29/49885* (2015.01); *Y10T 29/5367* (2015.01)

(58) Field of Classification Search
USPC .................................................. 29/252
See application file for complete search history.

(56) References Cited

U.S. PATENT DOCUMENTS

| | | | | |
|---|---|---|---|---|
| 1,894,835 | A * | 1/1933 | Smith | B29C 65/10 219/611 |
| 3,469,298 | A * | 9/1969 | Pizzagalli | F16L 1/09 29/237 |
| 3,727,289 | A * | 4/1973 | Bemelmann | B29C 65/20 156/158 |
| 3,803,901 | A * | 4/1974 | McConnell | G01M 3/022 138/90 |
| 4,189,817 | A * | 2/1980 | Moebius | B25B 27/10 29/237 |
| 4,328,608 | A | 5/1982 | Gibson | |
| 4,955,122 | A * | 9/1990 | Ootsuki | B25B 5/061 29/213.1 |
| 4,956,904 | A * | 9/1990 | Yamamoto | B21D 39/046 29/237 |
| 5,015,017 | A * | 5/1991 | Geary | F16L 15/001 285/333 |
| 5,079,816 | A * | 1/1992 | Fisk | B23P 19/027 29/237 |
| 5,184,391 | A * | 2/1993 | Fisk | B23P 19/027 29/237 |
| 5,709,417 | A | 1/1998 | Verbeck | |
| 7,404,244 | B2 * | 7/2008 | Pyron | B01D 46/02 29/33 D |
| 9,016,983 | B2 * | 4/2015 | Li | E21D 9/003 405/141 |

* cited by examiner

*Primary Examiner* — Alvin Grant
(74) *Attorney, Agent, or Firm* — Bracewell LLP; Taylor P. Evans

(57) ABSTRACT

An apparatus for assembling a positive seal coupling and a pipe, including a frame, a stationary block assembly attached to the frame and having coupling gripping doors, and a traveling block assembly slidably attached to the frame and having pipe gripping doors. Two hydraulic ram cylinders are attached to the frame that have ram cylinder rods attached to the traveling block assembly so that the hydraulic ram cylinders can move the traveling block assembly toward the stationary block assembly. The coupling gripping doors are axially aligned with the pipe gripping doors so that when the hydraulic ram cylinders move the traveling block assembly toward the stationary block assembly, a pipe held by the pipe gripping doors is inserted into a coupling held by the coupling gripping doors.

12 Claims, 18 Drawing Sheets

Enter Setup Information

Client Name & Representative
FAFPC

Prime Contractor Name & Representative
FAFPC

PSC Installation Company
JETAIR

JU Operator
JLI

Jetair Int'l Installation Supervisor
JLI

PSC Installation Co. Job No. *
J607

Project Name *
8-IN PROOF

Pipeline Name
NA

Line Pipe Spec. NPS xWall t(in.&mm.)x API 5L Grade
8x0.5xAPI 5L

PSC DC No. *
S1063C230

PSC Serial No. *
1001

PSC Length (PSC L), in. *
23.0

PSC External Coating
NA

Flex Allowance *
0.00

SRG PN
NA

Pipeline MAOP, Min Hydrotest, Max Hydrotest
3000 PSI

Comments
1ST END

Insertion
1st end

Following Characters are NOT allowed:
\ / : * ? " < > |
*required fields!

Pipeline Installation
⦿ Above Grnd  ◯ Buried

Line Pipe Coating
☐ Internal  ☑ External

SRG Installed Check
☑ Internal

[Cancel]  [Keyboard]  [Read Setup]  [RUN]

*FIG. 14B*

Channel Setup

| Enable | Channel Name | Units | Hardware Gain | Calibrated at [Engr. Units] | Cal. Factor [mA] | Cal. Offset [Volts] | | Cal. Gain | Voltage | Value |
|---|---|---|---|---|---|---|---|---|---|---|
| ☒ | RAM | PSI | 1 (+/-10V) ▽ | 5000.0 | 16.040 | 0.966 | ○ | 1246.88 | 0.957 | -10.93 |
| ☒ | Pipe | PSI | 1 (+/-10V) ▽ | 5000.0 | 15.948 | 0.966 | ○ | 1254.08 | 0.957 | -11.38 |
| ☒ | Coupling | PSI | 1 (+/-10V) ▽ | 5000.0 | 15.971 | 0.966 | ○ | 1252.27 | 0.960 | -7.52 |
| ☒ | LVDT | Inch | 1 (+/-10V) ▽ | -20.0 | 14.390 | 4.750 | ○ | -5.56 | 4.740 | 0.05 |
| ☒ | RAM2 | PSI | 1 (+/-10V) ▽ | 5000.0 | 15.869 | 0.999 | ○ | 1260.32 | 0.996 | -4.13 |

Read Setup File | Save Setup File

C:\Program Files\PSCIDMS v1.6\Setup\DefaultSetup.xml

Apply | Cancel

Keyboard | Main Menu

Jetkar International
A Division of Marubeni-Itochu Tubulars America Inc.

*FIG. 14G*

POSITIVE SEAL COUPLING SYSTEM

CROSS REFERENCE TO RELATED APPLICATIONS

This application is a continuation of co-pending U.S. patent application Ser. No. 14/255,731, filed Apr. 17, 2014, which claims priority to and the benefit of U.S. Provisional Patent Application Ser. No. 61/813,470, which was filed Apr. 18, 2013, the full disclosures of which are hereby incorporated herein by reference.

FIELD OF THE INVENTION

The present technology relates to the assembly of pipe lines, and in particular to a positive seal coupling for joining pipes without welding, as well as an apparatus for pressing threadless pipe axially into a positive seal coupling to form a string of pipeline.

BACKGROUND

Pipes used, for example, in oilfield pipelines, have been joined end-to-end to transport oil or other fluids from place to place. Often, pipelines have been joined by such methods as threading, welding, bolting, and the like. However, problems have developed with each of these pipe joining methods. For example, threaded connections loosen, leading to leaking of fluids from the joints. Connections made by welding, or bolted flanges, are labor intensive to install, and can be costly to manufacture.

To solve some of these problems, alternative solutions have been proposed. For example, a tubular coupling member can be employed to accept the ends of adjacent pipe sections. If the inner diameter of the tubular coupling member is slightly smaller than the outer diameter of the pipes, and the pipes are forced into the coupling, an interference fit is created that is secure and can be resistant to leakage. For example, such a coupling is disclosed in U.S. Pat. No. 5,709,417, the disclosure of which is incorporated herein by reference. This coupling, however, can be improved. For example, certain aspects of the interior profile of this coupling can be susceptible to stress concentrations, which create a need for thicker coupling walls to ensure adequate coupling strength.

In addition, there are known methods of making up coupling/pipe assemblies such as those discussed above. For example, one method is to use a joining machine such as that disclosed in U.S. Pat. No. 4,328,608, the disclosure of which is hereby incorporated herein by reference. Such a device grips the coupling and the pipe, and uses hydraulic force to push the pipe into the coupling. Despite the ability of such a machine to help make up the coupling/pipe assemblies, however, further improvements can be made. For example, greater precision and more reliable joints can be made up by closer monitoring of operational parameters while the pipe joints are assembled.

SUMMARY OF THE INVENTION

One embodiment of the present technology provides an apparatus for assembling a positive seal coupling and a pipe. The apparatus includes a frame, a stationary block assembly attached to the frame and having coupling gripping doors, a traveling block assembly slidably attached to the frame and having pipe gripping doors, and two hydraulic ram cylinders attached to the frame and having ram cylinder rods attached to the traveling block assembly so that the hydraulic ram cylinders can move the traveling block assembly toward the stationary block assembly. The coupling gripping doors are axially aligned with the pipe gripping doors so that when the hydraulic ram cylinders move the traveling block assembly toward the stationary block assembly, a pipe held by the pipe gripping doors is inserted into a coupling held by the coupling gripping doors. In some embodiments the coupling gripping doors can be controlled by coupling gripping door cylinders, and the pipe gripping doors can be controlled by pipe gripping door cylinders.

The apparatus can further include at least one pressure transducer in communication with at least one of the pipe door cylinders and the coupling door cylinders to sense pressure therein, and a linear displacement transducer in communication with the ram cylinder rod to sense linear displacement of the ram cylinder rod. Furthermore, a data monitoring system can be connected to the at least one pressure transducers and the linear displacement transducer, and can receive information sensed by the pressure transducers and the linear displacement transducer, and can generate a record of operational parameters. In addition, a display can communicate with the data monitoring system and display information to an operator.

In certain embodiments, the apparatus can further include at least one pipe lift vee roller controlled by at least one pipe lift cylinder, and installed to at least one side of the stationary block assembly and the traveling block assembly of the field joining unit, and at least one pipe guide vee roller controlled by at least one pipe guide cylinder, and installed between the stationary block assembly and the traveling block assembly of the field joining unit. The apparatus can also include pressure gauges in communication with the coupling door cylinders, the pipe door cylinders, the at least one pipe lift cylinder, and the at least one pipe guide cylinder to sense pressure therein, pressure transducers in communication with the coupling door cylinders and the pipe door cylinders to sense pressure therein, pressure transducers in communication with the hydraulic ram cylinders to sense the pressure difference therebetween, and a differential pressure gauge in communication with the hydraulic ram cylinders to sense the pressure difference therebetween.

In some embodiments, the pipe can have a diameter of between about 2 inches and about 12 inches. In addition, the apparatus can include coupling slips attached to the inside of the coupling gripping doors to help grip the coupling, and pipe slips attached to the inside of the pipe gripping doors to help grip the pipe. In addition, the apparatus can include roller support beams attached to the frame, and beam rollers attached to the traveling block assembly, wherein the beam rollers roll relative to the roller support beams as the travelling block assembly is moved by the hydraulic ram cylinders.

Another embodiment of the present technology provides an apparatus for assembling a positive seal coupling and a pipe that includes a frame, a coupling gripping assembly fixedly attached to the frame for gripping a coupling, a pipe gripping assembly slidably attached to the frame for gripping a pipe, and a hydraulic ram cylinder having a ram cylinder rod and attached to the pipe gripping assembly for moving the pipe gripping assembly toward the coupling gripping assembly. The coupling gripping assembly is aligned with the pipe gripping assembly so that when the hydraulic ram cylinder moves the pipe gripping assembly toward the coupling gripping assembly, the pipe is inserted into the coupling. The apparatus can also include at least one pressure transducer in communication with at least one of the pipe or coupling gripping assemblies, a linear displacement transducer in communication with the hydraulic ram cylinder to sense linear displacement of the ram cylinder rod, and a data monitoring system connected to the at least one pressure transducer and the linear displacement transducer for monitoring operational parameters.

In some embodiments, coupling gripping assembly can further include coupling gripping doors that clamp around the coupling to prevent axial movement of the coupling relative to the coupling gripping assembly. Similarly, the pipe gripping assembly can further include pipe gripping doors that clamp around the pipe to prevent axial movement of the pipe relative to the pipe gripping doors. Furthermore, the coupling gripping doors can include coupling slips attached to the inside of the coupling gripping doors to help grip the coupling, and the pipe gripping doors can include pipe slips attached to the inside of the pipe gripping doors to help grip the pipe.

Yet another embodiment of the present technology provides a method for making up a positive seal coupling assembly. The method includes the steps of providing a field joining unit having hydraulic doors for gripping a coupling and a pipe, a hydraulic ram cylinder for forcing the end of the pipe into the coupling, cleaning an end of the pipe, and inserting the end of the pipe into the coupling by applying a retractive force to the pipe with the hydraulic ram cylinders, thereby pulling the pipe into the coupling a predetermined distance.

In some embodiments, the field joining unit can be equipped with pressure transducers for sensing pressure in the hydraulic doors and ram cylinders, and a linear displacement transducer for measuring the depth of insertion of the pipe into the coupling. The method can further include measuring the distance that the pipe is inserted into the coupling with the linear displacement transducer, displaying information measured by the linear displacement transducer and the pressure transducers on a display for an operator to see, and generating a record of the linear displacement and pressure data.

In certain embodiments, the method can further include applying an epoxy coating to the exterior surface of the pipe near the pipe end, applying an epoxy coating to the inside of the coupling, and/or inserting a spacer ring gasket into the center of the coupling prior to inserting an end of the pipe into the coupling. Furthermore, the field joining unit can have differential pressure gauges, and the method can include measuring the differential pressure in the hydraulic ram cylinders using the differential pressure gauges and the pressure transducers.

BRIEF DESCRIPTION OF THE DRAWINGS

The present technology will be better understood on reading the following detailed description of nonlimiting embodiments thereof, and on examining the accompanying drawings, in which:

FIG. 14B is a screen shot of the SETUP screen of the PSCIDMS software;

FIG. 14G is a CALIBRATION (Channel Setup) screen of the PSCIDMS software.

DETAILED DESCRIPTION OF THE EXEMPLARY EMBODIMENTS

Figure 1:
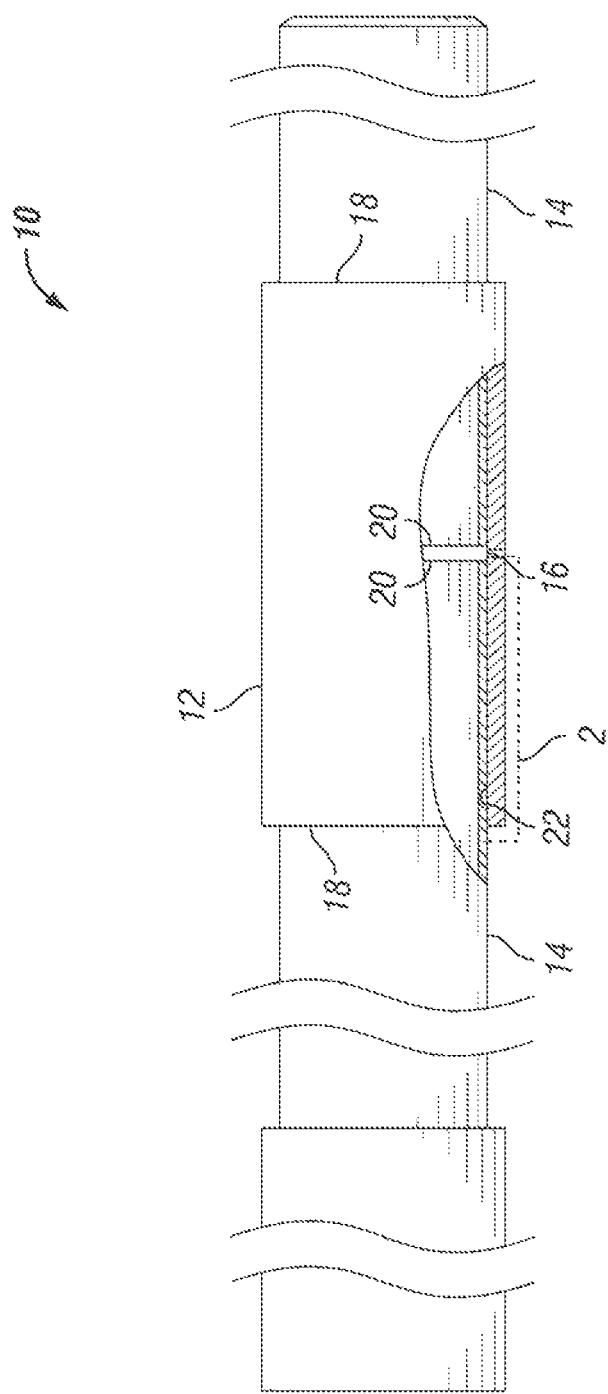
FIG. 1 is a side partial cross-sectional view of a coupling with pipe assembly according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose.

FIG. 1 is a side partial cross-sectional view of a coupling with pipe assembly 10 according to an embodiment of the present technology. The assembly 10 includes a positive seal coupling 12 and pipe sections 14. The coupling with pipe assembly 10 can also include spacer ring gasket (SRG) 16. In the assembled state, as shown in FIG. 1, the pipes 14 are inserted into the coupling ends 18 of the positive seal coupling 12 until the pipe ends 20 reach a predetermined distance, with the spacer ring gasket (SRG) 16 positioned in between. The SRG serves as a protective bumper between the pipe ends upon completion of the make-up and it also forms a redundant seal when it is energized between the pipe ends. The interior surface 22 of the positive seal coupling 12 is profiled as shown in FIG. 2 to help prevent movement of the pipes 14 relative to the positive seal coupling 12 after the coupling assembly 10 has been assembled.

Figure 2:
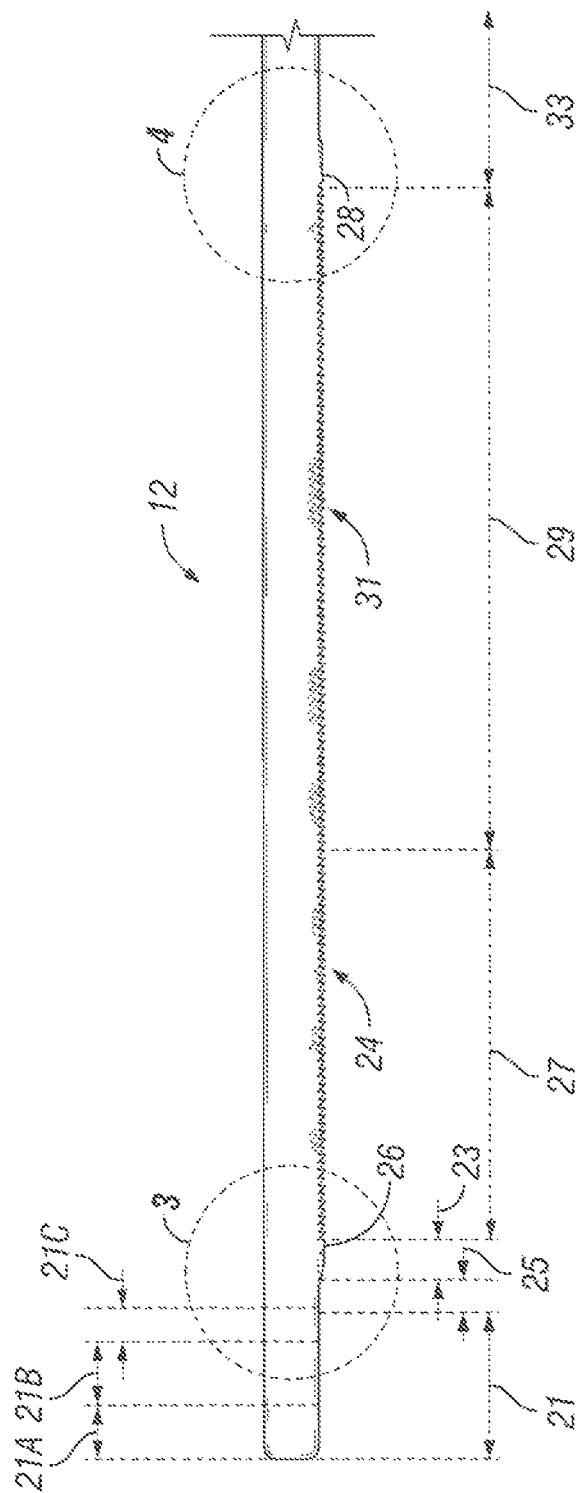
FIG. 2 is a partial cross-sectional view of a positive seal coupling as indicated by area 2 of FIG. 1.

Referring to FIG. 2, there is shown a representative cross-section of the positive seal coupling 12 as indicated by area 2 in FIG. 1, showing the internal profile of one side of the positive seal coupling 12. The internal profile of the positive seal coupling 12 has a number of different sections, each of which performs a distinct function. For example, an outermost section 21 has a short cylindrical surface 21A that has a diameter slightly larger than the outer diameter of the pipe 14 being joined. This section guides the end of the pipe 14 into the positive seal coupling 12. The surface 21A leads to an inwardly inclined surface 21B. Then, the surface 21B leads to another cylindrical surface 21C that has a diameter slightly less than the outer diameter of the pipe 14 being joined. This section serves at least three purposes. One is to remove any ovality in the pipe 14. A second is to align the axis of the pipe 14 with the axis of the coupling 12. A third is to pre-stress the pipe 14 for insertion into subsequent sections of the coupling 12.

Section 23 is curved, providing an area for excess epoxy (applied as discussed in more detail below), as well as any debris to be deposited without interfering with the connection. The transition section 25, between sections 21C and 23, is smooth, thereby reducing any stress concentrations in this section of the coupling 12.

Section 27 provides a plurality of inwardly directed helical serrations 24. This plurality of inwardly directed helical serrations 24 penetrate the outer surfaces of the pipes 14 when the pipes are inserted into the positive seal coupling 12, thereby creating a mechanical resistance to the separation of the pipe 14 and coupling 12. Section 29 provides a plurality of inwardly directed circumferential serrations 31. One purpose of section 29 is to add additional resistance to the separation of the pipe 14 and coupling 12, and another is to seal the connection. If the entire threaded section of the coupling 12 had helical serrations 24, there would be a path for the liquid in the pipeline to leak from the joint. Thus, the circumferential serrations 31 act as redundant metal to metal seals to ensure a leak proof connection. In alternative embodiments, all of the serrations, along both sections 27 and 29, could be circumferential serrations 31. The serrations 24, 31 are bounded on either end with first and second end serrations 26, 28 that are shaped differently from the inward directed serrations 24, 31. Middle section 33 provides a space for the spacer ring gasket (SRG) 16, which helps to provide an additional seal between the ends of each pipe section.

Figure 3:
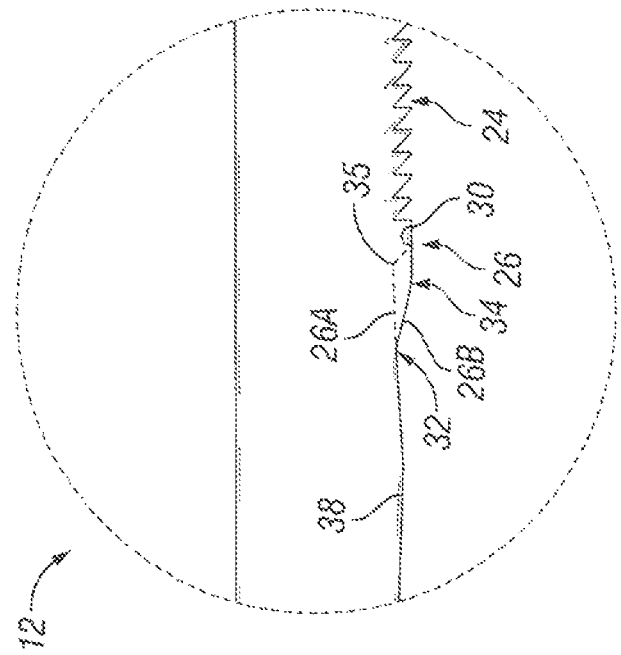
FIG. 3 is a cross-sectional view of a first end serration of the positive seal coupling as indicated by area 3 of FIG. 2.

FIG. 3 shows an enlarged cross-sectional view of a portion of the positive seal coupling 12, including the first end serration 26. Two different profiles are shown for first end serration 26, including profile 26A, and profile 26B. Profile 26A represents profiles used previously on positive seal couplings 12. As can be seen, profile 26A includes sharper corners 35, 30 than profile 26B. Profile 26B is softer and more rounded. In the particular embodiment shown, profile 26B includes a first radius 32 of about 0.75 inches, and a second radius 34 of about 0.25 inches. These two radii are coupled to provide a gradual transition from the first end serration 26 to a flat portion 38 of the positive seal coupling 12. Of course, the exact dimensions of the radii are not critical, but can be changed according to the design needs of a particular coupling.

Figure 4:
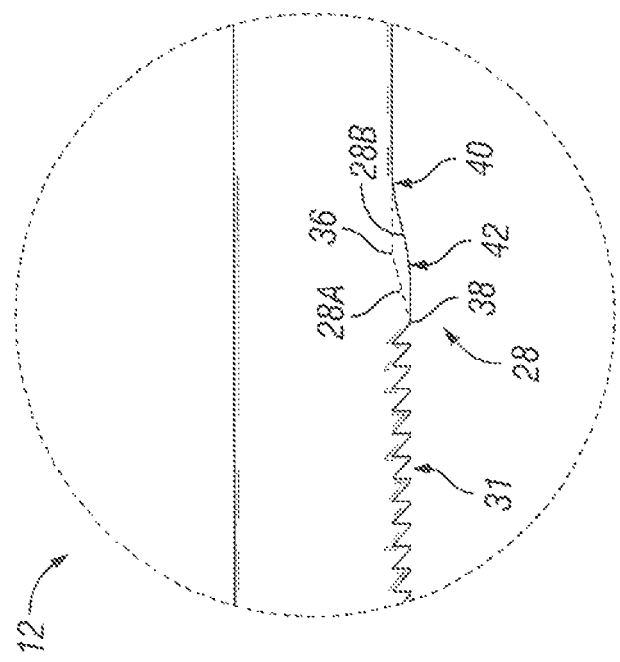
FIG. 4 is a cross-sectional view of a second end serration of the positive seal coupling as indicated by area 4 of FIG. 2.

Similarly, FIG. 4 shows an enlarged cross-sectional view of a portion of the positive seal coupling 12, including the second end serration 28. Again, two different profiles are shown for second end serration 28, including profile 28A, and profile 28B. Profile 28A represents profiles used previously on positive seal couplings 12. As can be seen, the corners 36, 38 of profile 28A are sharper than the curves of profile 28B. Profile 28B is softer and more rounded. In the embodiment shown, profile 28B includes a first radius 40 of about 1.5 inches, and a second radius 42 of about 0.5 inches. Of course, the exact dimensions of the radii are not critical, but can be changed according to the design needs of a particular coupling.

One benefit of providing first and second end serrations 26, 28 with profiles 26B, 28B is that the softening, or rounding of the contours leads to reduced stress concentrations in the end serrations 26, 28 when the coupling assembly 10 is under load. This reduction in stress concentrations allows for the use of a positive seal coupling 12 having a reduced thickness over those couplings known in the art. For instance, in one example, changing the profile of the end serrations 26, 28 as disclosed herein allows for a reduction in coupling thickness from about 0.554 inches to about 0.421 inches. Such a significant reduction in thickness is advantageous because it means lower material costs to manufacture the coupling, and lower shipping and transportation costs to transport the coupling to a job site.

It is to be understood that each coupling 12 is application specific. Thus, the coupling 12 dimensions are determined based on the pipeline specifications (e.g., pipe size, pipe thickness, line pressure, etc.) using advanced computer-aided numerical analysis techniques. This means that the performance of the coupling does not vary from one application to the next. Accordingly, although specific dimensions and tolerances have been disclosed above, the present technology anticipates that those dimensions and tolerances can deviate according to the design of a specific coupling assembly without departing from the spirit and scope of the invention.

Assembly of the coupling assembly 10 of the present technology is a simple process that can be efficiently accomplished. Initially, the surface of the pipe 14 near its end 20 is cleaned. This cleaning can be accomplished using, for example, a sand blaster, or any other appropriate means. The surface of the pipe 14 can typically be cleaned until it reaches a "near white" metal condition over the insertion depth, equal to one half the length of the positive seal coupling 12.

Figure 5:
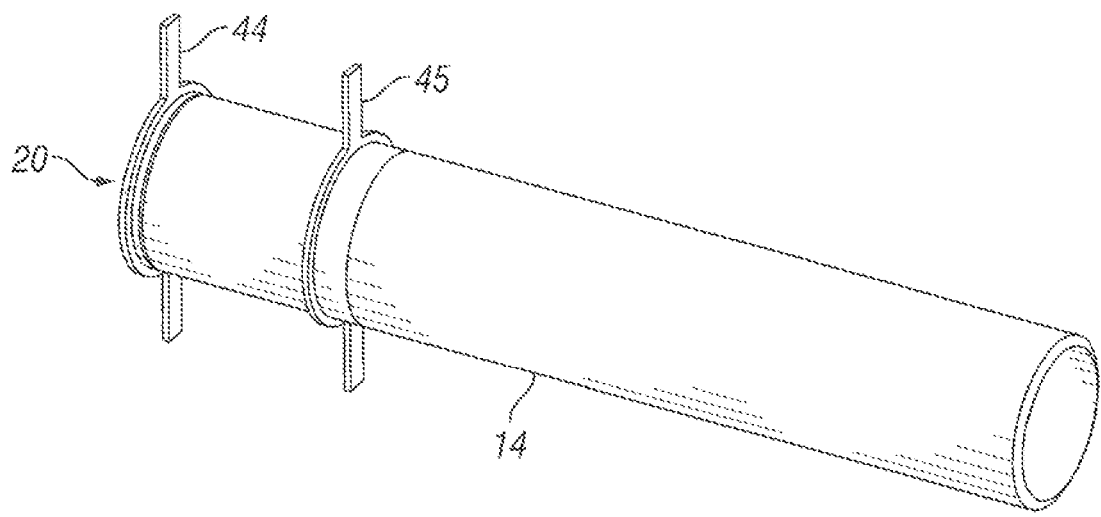
FIG. 5 is a perspective view of a pipe end according to an embodiment of the present technology, including tools for measuring the outer diameter of the pipe end.

Once the pipe end has been cleaned over at least the insertion depth (about ½ of the coupling length), the outer diameter of the pipe 14 can be measured near the end 20 thereof, as shown in FIG. 5. Typically, the outer diameter is checked for API 5L tolerance conformance. In one embodiment, this measurement can be taken using precision "Go & No-Go" ring gauges 44, 45. The desired outer diameter of the pipe 14 is slightly larger than the inner diameter of the positive seal coupling 12, so that when the pipe 14 is fit into the positive seal coupling 12 there is an interference fit between them. To measure the outside diameter using the ring gauges 44, 45, an operator first slides ring gauge 45 onto the pipe insertion end of the pipe 14 to check if the outer diameter is above the maximum diameter allowance. Then, the operator can slide the ring gauge 44 onto the pipe insertion end of the pipe 14 to check if the outer diameter is below the minimum diameter allowance. Once the outer diameter of the pipe 14 has been verified, the thickness of the pipe wall can be checked to verify that it is within appropriate tolerances. Typically, the thickness of the pipe 14 should be within API 5L tolerance conformance. The pipe wall thickness measurement can be taken using a precision ultrasonic steel thickness gauge (not shown), or any other appropriate tool.

Figure 6:
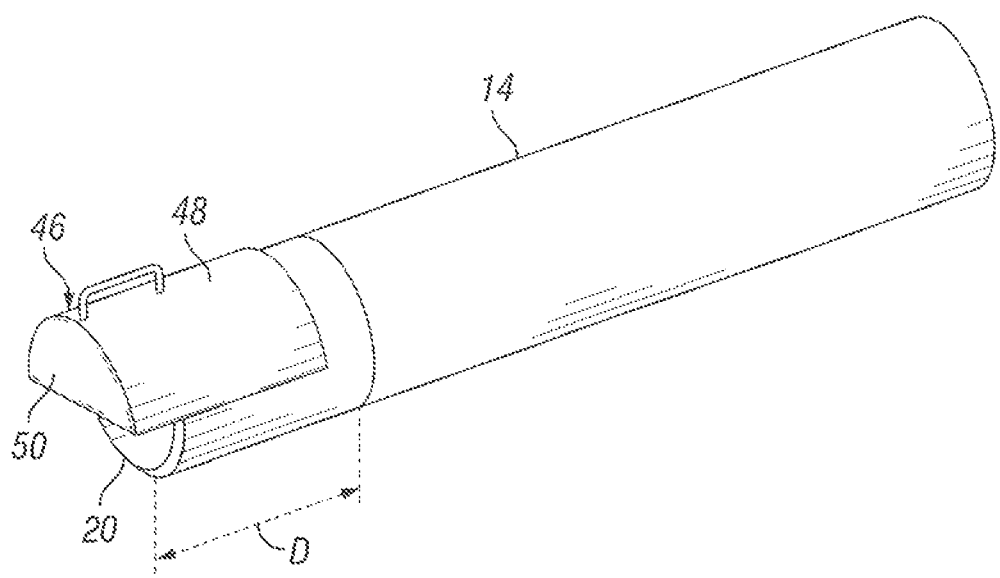
FIG. 6 is a perspective view of a pipe end according to an embodiment of the present technology, including a tool for measuring the depth of insertion of the pipe.

Next, as shown in FIG. 6, the correct insertion depth D is measured, and can be marked on the exterior surface of the pipe end. This measurement can be taken using a depth measuring tool 46. In FIG. 6, the depth measuring tool 46 has a semi-cylindrical shaped body 48 attached to an end face 50. The semi-cylindrical shaped body 48 is attached to the end face 50 and has the length D. To measure the correct insertion depth D, an operator fits the semi-cylindrical shaped body 48 of the depth measuring tool 46 on the surface of the pipe 14, and slides it along the surface of the pipe 14 until the end face 50 contacts the end 20 of the pipe 14. The operator can then mark the correct insertion depth D on the pipe 14 by placing a mark at the end of the semi-cylindrical shaped body 48 of the depth measuring tool 46.

The next step can be to optionally apply a lubricant/sealant to the exterior surface of the pipe 14 near the pipe end 20. The lubricant/sealant can be a specially formulated epoxy. This lubricant/sealant can also be applied over the full insertion depth of the interior of the positive seal coupling 12. The lubricating properties of the lubricant/sealant help the pipe 14 to slide into the positive seal coupling 12 during assembly. The epoxy can serve as a lubricant. It can prevent metal galling during pipe end insertion. In addition, the epoxy cures to form a secondary seal around the pipe ends and throughout the coupling-to-pipe interfacial surface.

Figure 7:
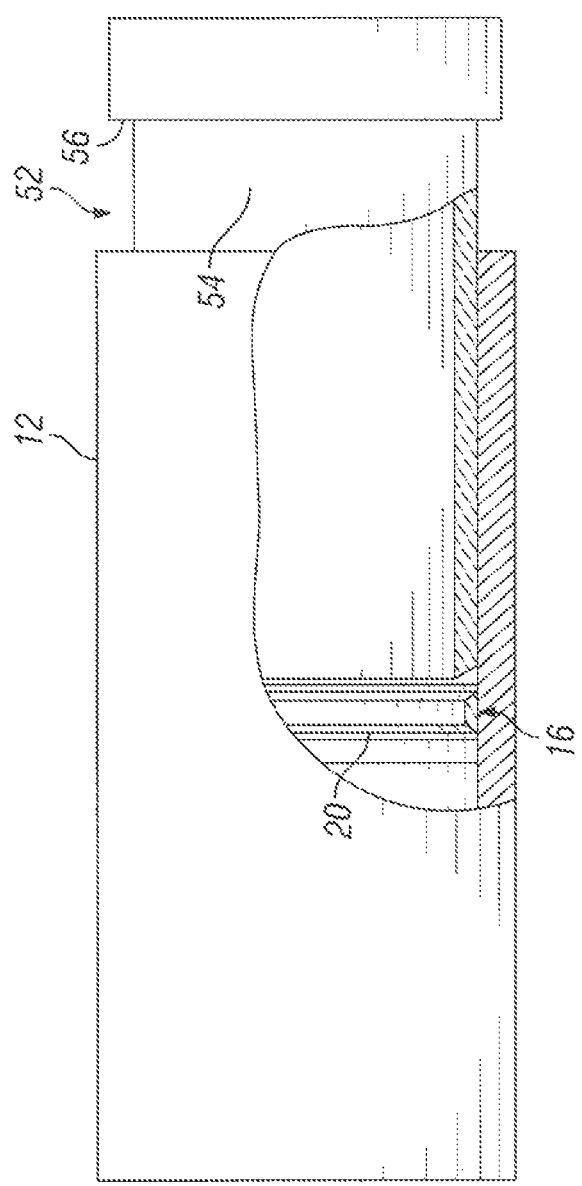
FIG. 7 is a fragment, partial cross-sectional view of the spacer ring gasket (SRG) positioned in the middle smooth bore section of the coupling by using the SRG seating tool.

FIG. 7 shows the step of inserting the spacer ring gasket (SRG) 16 into the positive seal coupling 12. The spacer ring gasket 16 serves as a bumper to prevent pipe end abutment damage. The spacer ring gasket 16 also forms a redundant seal at the interface between the pipe ends 20. The spacer ring gasket 16 is inserted after insertion of one, but not both, pipe ends 20. That is, after the coupling 12 is engaged with one pipe end 20, the spacer ring gasket can be introduced into the coupling 12 by a spacer ring gasket seating tool 52. The spacer ring gasket seating tool 52 has an outer diameter along an end portion 54 that is slightly less than the internal diameter of the positive seal coupling 12. In practice, the spacer ring gasket seating tool 52 pushes the spacer ring gasket 16 into the coupling until the spacer ring gasket 16 abuts the pipe end 20 that is already inserted into the positive seal coupling 12. Thereafter, the spacer ring gasket seating tool 52 can be removed from the positive seal coupling 12, leaving the spacer ring gasket 16 in place near the center of the positive seal coupling 12. In the embodiment shown in FIG. 7, the spacer ring gasket seating tool 52 has a shoulder 56 that limits the distance the spacer ring gasket seating tool 52 can enter into the positive seal coupling 12.

After application of the lubricant/sealant to the pipe 14 and positive seal coupling 12, and insertion of the spacer ring gasket 16, the pipe 14 is inserted into the positive seal coupling 12 to complete the coupling/pipe assembly 10. The insertion process includes hydraulically pressing the pipe end 20 into the positive seal coupling 12 for a controlled mechanical interference fit. This mechanical interference fit produces a metal-to-metal seal between the positive seal coupling 12 and the pipe 14. This insertion can be accomplished using a field joining unit 58, as discussed herein below. Once the coupling/pipe assembly 10 is complete, an external coating can be applied to the pipe 14 and positive seal coupling 12 if desired. Alternatively, such an external coating can be applied to the positive seal coupling 12 prior to assembly with the pipe 14.

In some embodiments the positive seal coupling 12 is designed to connect pipe 14 having a diameter of between about 2 inches and about 12 inches, and can be API 5L PSL2 Grade B up through any 'X' Grade and any corrosion resistant alloy (CRA) grade, schedule 5 through 160/XXS. One advantage of the coupling/pipe assembly 10 of the present technology is that it does not require welding or X-ray radiography. The positive seal coupling 12 allows for the connection of internally coated line pipe without damage to the internal coating. In addition, the positive seal coupling 12 connects externally coated line pipe without damage to the external coating, and eliminates the need for field girth weld coating, shrink sleeve or field joint tape wraps. Additional advantages of the coupling/pipe assembly 10 are that the assembly process does not require significant pipe end preparation, there is no internal flow restriction through the pipes at the coupling, and construction of the joints is two to four times faster than welded construction.

Figure 8A:
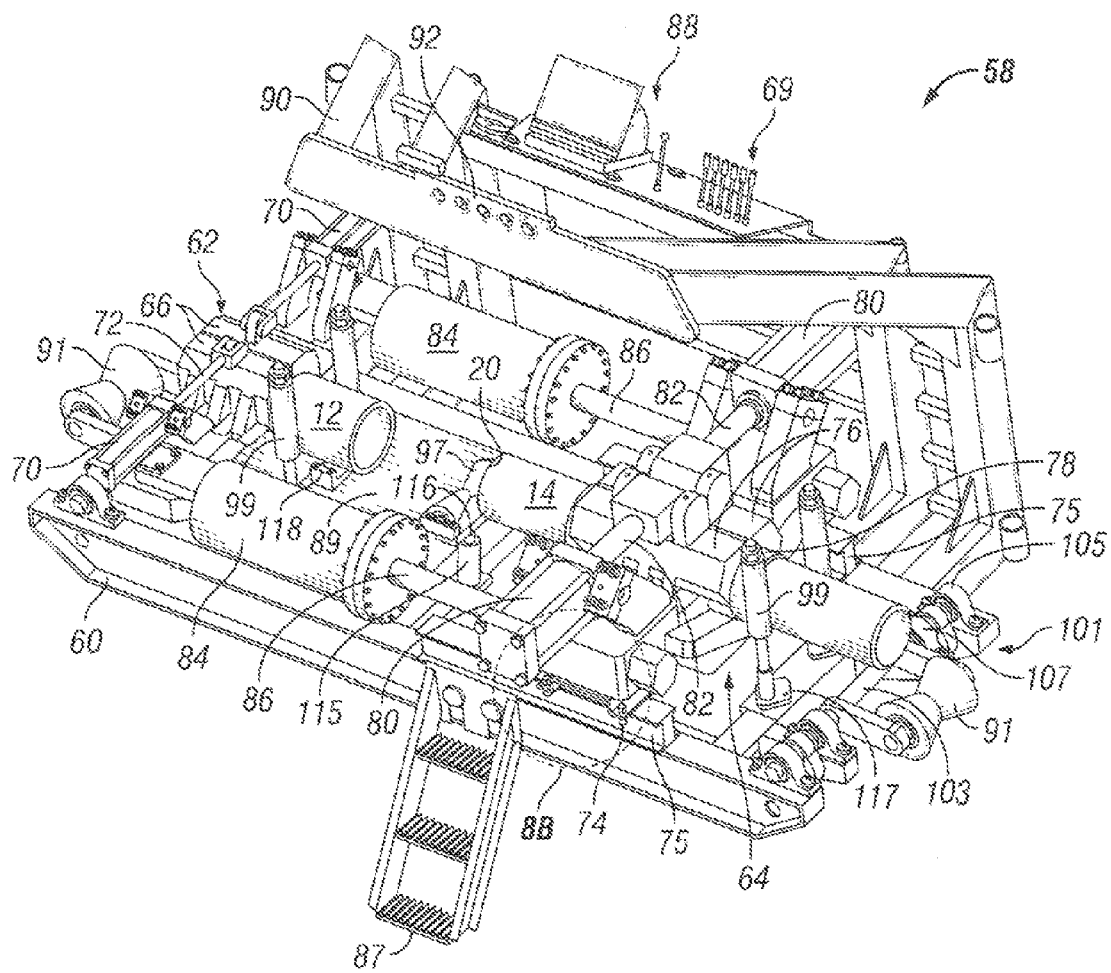
FIG. 8A is a left perspective view of a field joining unit for making up the coupling with pipe assembly.

Referring now to FIG. 8A, there is shown field joining unit 58 according to an embodiment of the present technology. The purpose of the field joining unit 58 is to push the end 20 of the pipe 14 into the coupling 12, and to repeat this action on adjacent sections of the newly coupled pipe joint, thereby creating a pipeline. The field joining unit 58 includes a main frame 60, a stationary block assembly 62, and a traveling block assembly 64.

Figure 9:
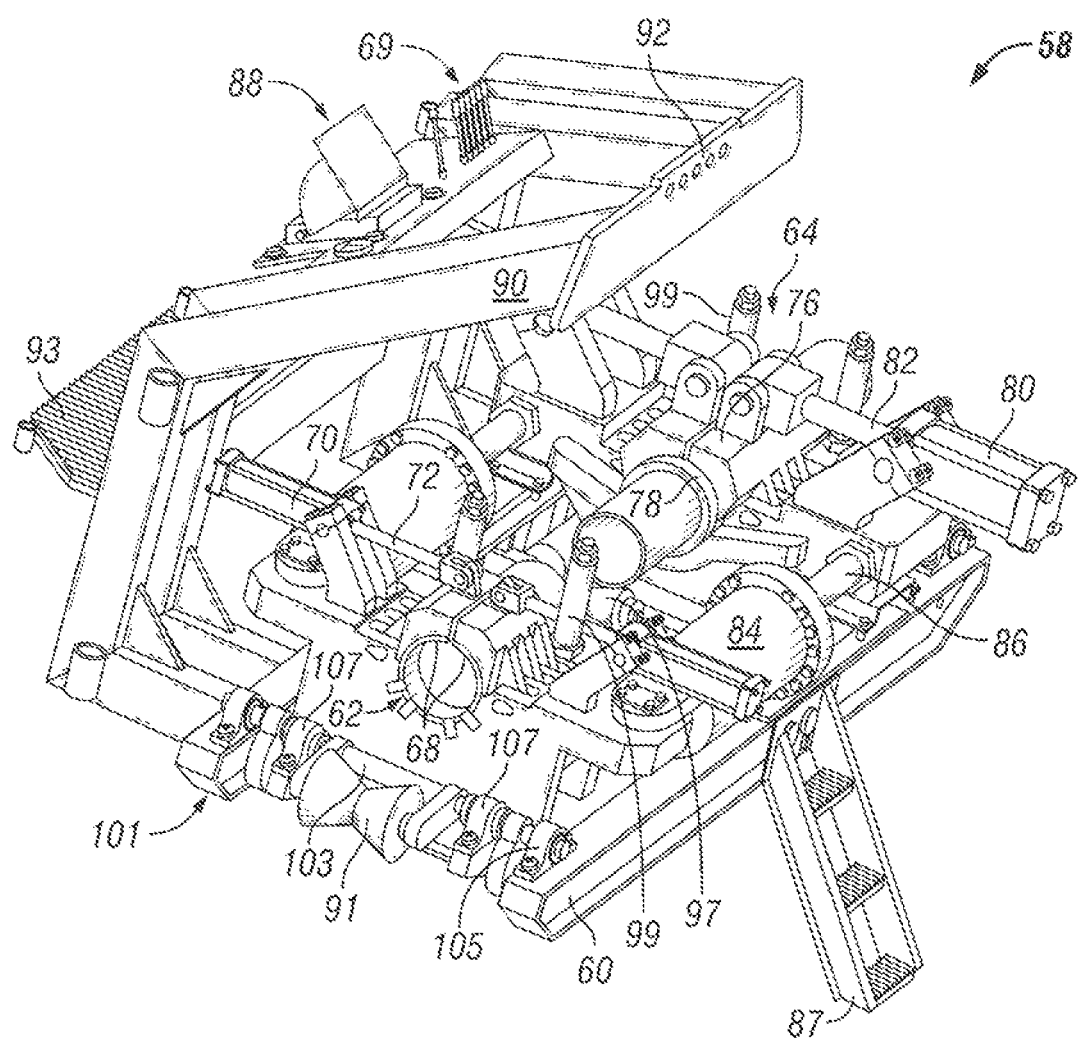
FIG. 9 is a right perspective view of the field joining unit shown in FIG. 8A.
Figure 12:
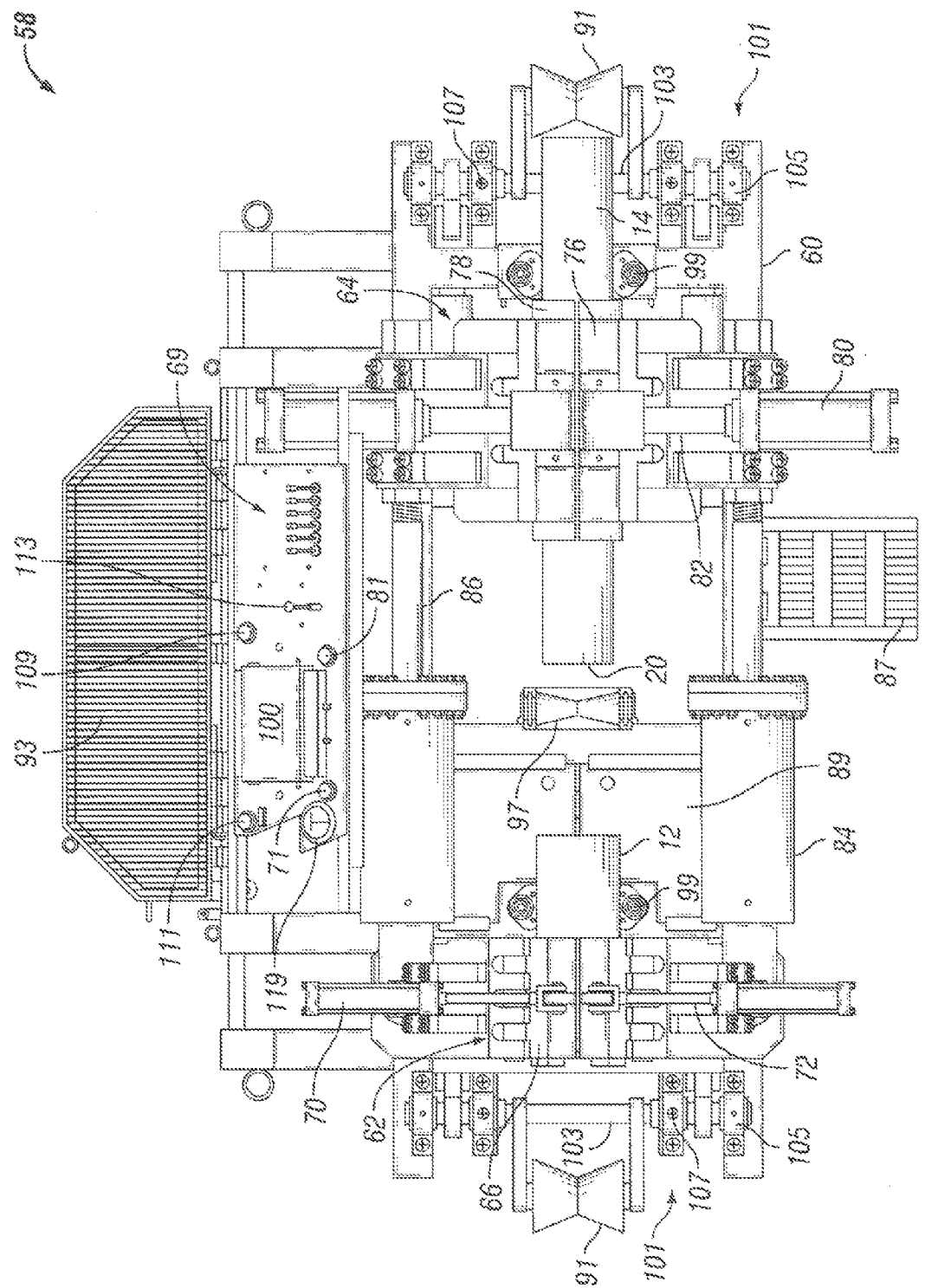
FIG. 12 is a top view of the field joining unit shown in FIGS. 8A and 9-11A, with some components removed.
Figure 13:
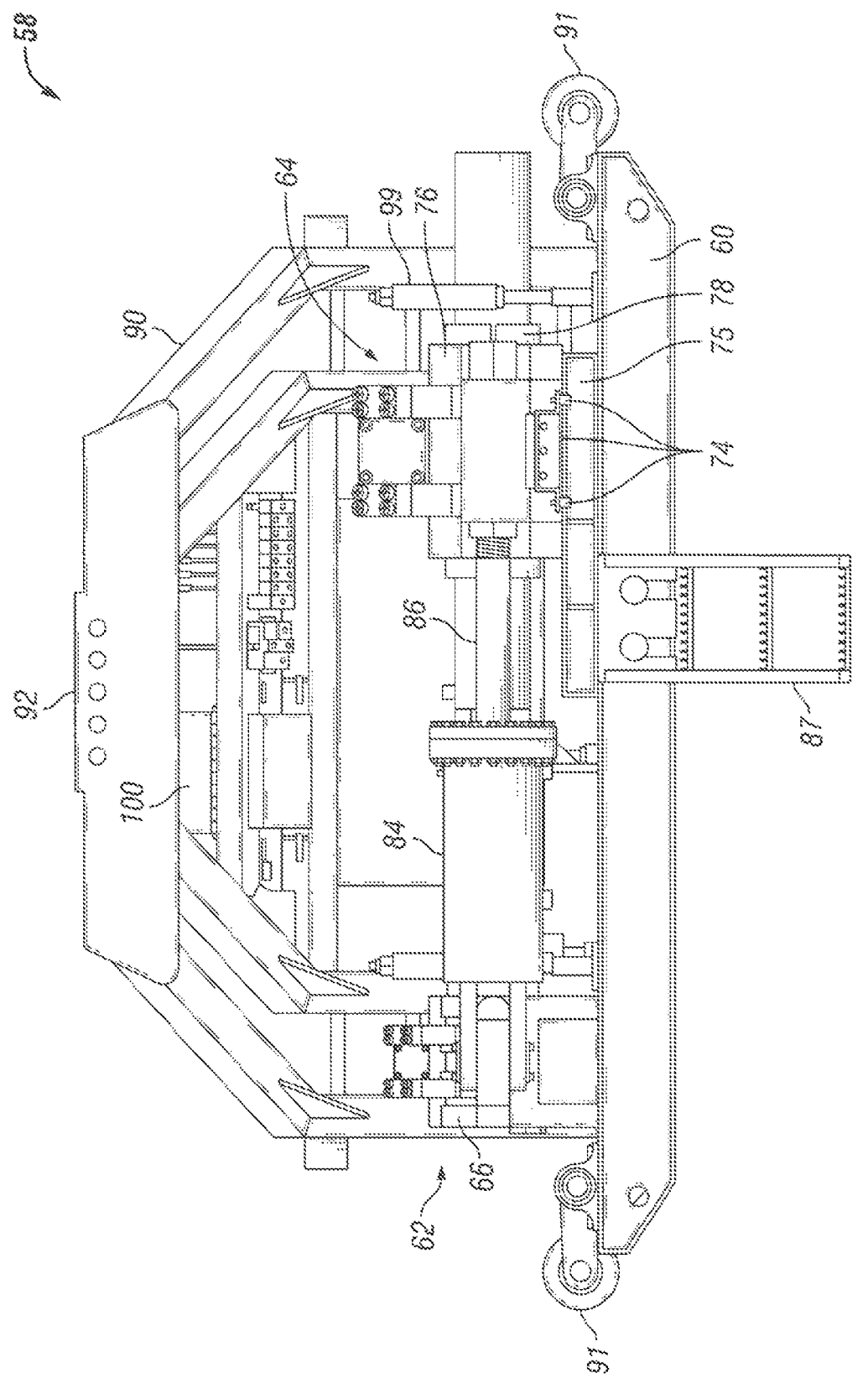
FIG. 13 is a back view of the field joining unit shown in FIGS. 8A, 9-11A, and 12.

The stationary block assembly 62 is mounted to the main frame 60, and includes two coupling doors 66 with coupling slips 68 (best shown in FIG. 9) mounted therein. The coupling doors 66 and coupling slips 68 are designed to close around the coupling 12, and to hold the coupling 12 firmly in place. The coupling doors 66 can be opened and closed by the coupling door cylinders 70 having the coupling cylinder rods 72 attached to the coupling doors 66. The coupling door cylinders 70 can be remotely actuated to open and close the coupling doors from a multi-station directional control valve with handlevers 69 mounted on a control panel 88 (discussed in greater detail below). The multi-station directional control valve has a built-in pressure reducing valve (not shown) in hydraulic communication with the coupling door cylinders 70 to generate the proper hydraulic pressure to close the coupling doors 66 firmly and hold the coupling 12 in place. Also, a coupling door cylinder pressure gauge 71 (best shown in FIG. 12) can be mounted on the control panel 88 to monitor the coupling doors' hydraulic pressure. This arrangement helps to prevent any axial movement between the coupling slips 68 and the coupling 12.

The use of two coupling doors 66 helps to distribute bearing pressure between the coupling 12 and the coupling slips 68 more evenly along the length of the coupling 12, thereby minimizing the potential for uneven deformation in the coupling 12. In addition, the use of coupling slips 68 allows the couplings 12 to be gripped using interfacial bearing pressure and frictional gripping forces uniformly around the coupling 12 over the portion of the coupling 12 gripped by the coupling slips 68.

Figure 8B:
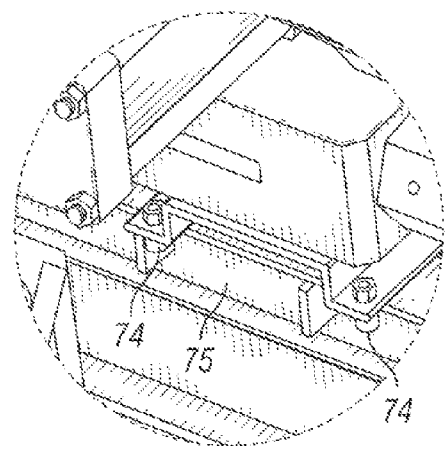
FIG. 8B is an enlarged view of the area 8B of FIG. 8A, and includes a close up view of the beam rollers attached to the travelling block assembly.
Figure 11A:
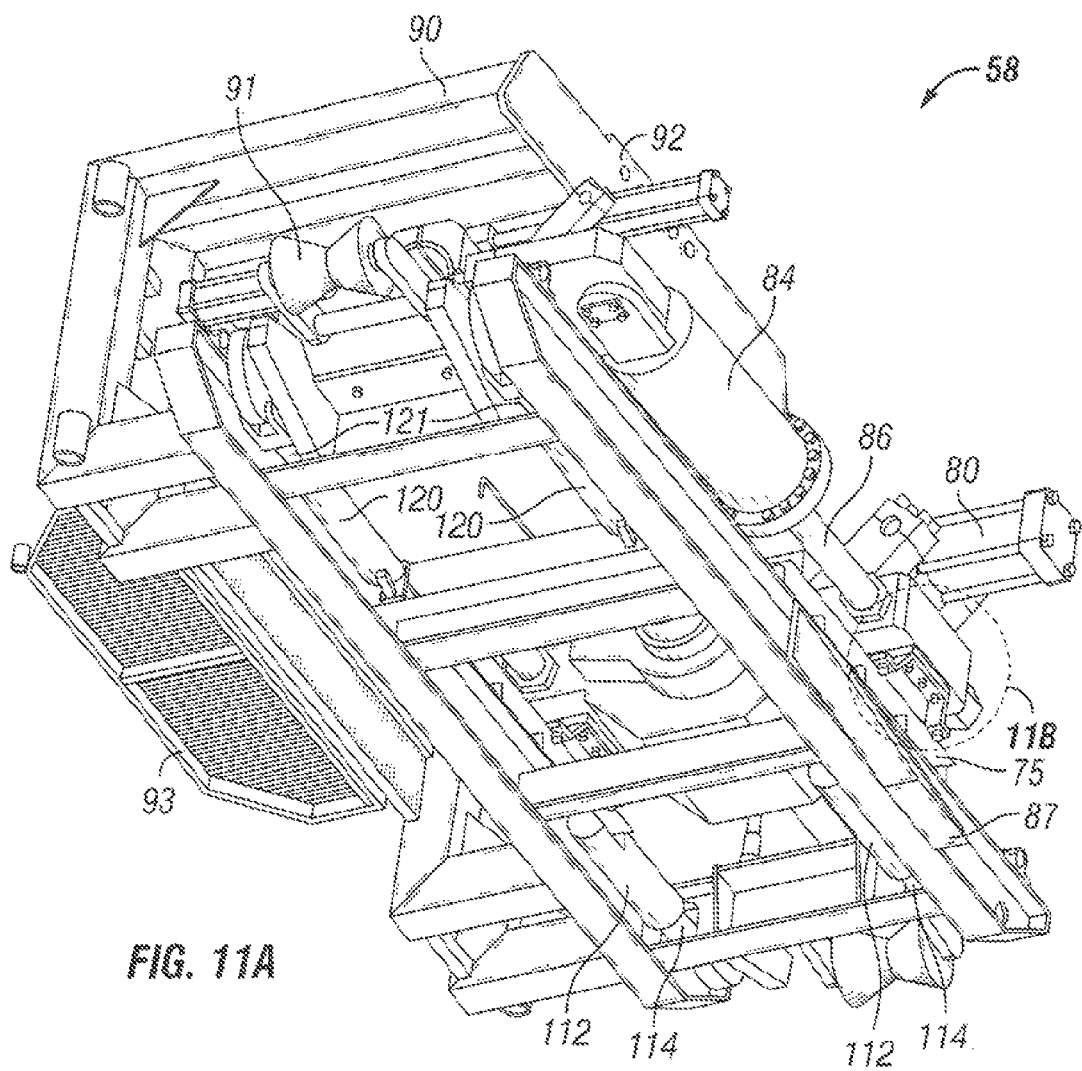
FIG. 11A is a bottom perspective view of the field joining unit shown in FIGS. 8A, 9, and 10.
Figure 11B:
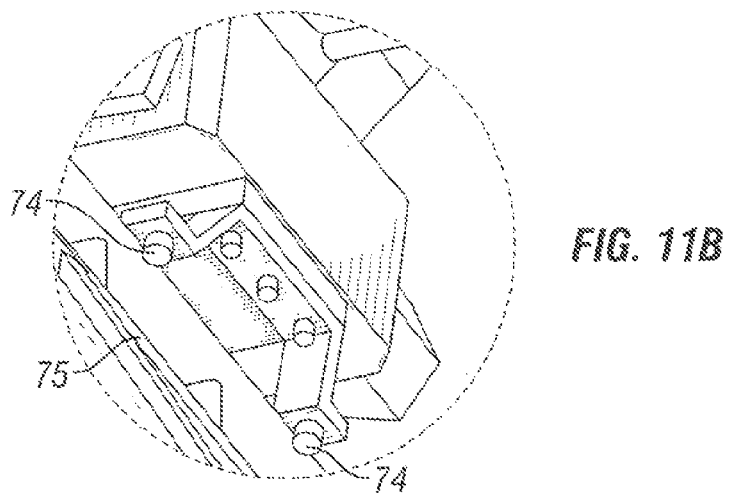
FIG. 11B is an enlarged view of the area 11B of FIG. 11A, and includes a close up view of the beam rollers attached to the travelling block assembly.

The traveling block assembly 64 sits on the beam rollers 74, as best shown in FIGS. 8B and 11B, and can slide longitudinally on the roller support beams 75 attached to the main frame 60. The traveling block assembly 64 also includes two pipe doors 76 with pipe slips 78 mounted therein. The pipe doors 76 and pipe slips 78 are designed to close around the pipe 14, and to hold the pipe 14 firmly. The pipe doors 76 can be opened and closed by the pipe door hydraulic cylinders 80 having the pipe door cylinder rods 82 attached to the pipe doors 76. The pipe door hydraulic cylinders 80 are also remotely actuated to open and close the pipe doors 76 from the multi-station directional control valve with handlevers 69, which is mounted on the control panel 88. The multi-station directional control valve has a built-in pressure reducing valve (not shown) in hydraulic communication with pipe door hydraulic cylinders 80 to generate the proper hydraulic pressure to close the pipe doors 76 firmly and hold the pipe 14 in place. Also, a pipe door cylinder pressure gauge 81 (best shown in FIG. 12) is mounted on the control panel 88 to monitor the pipe door hydraulic pressure. This arrangement helps to prevent any relative axial movement between the pipe slips 78 and the pipe 14. When the pipe 14 is gripped by the pipe doors 76, and the coupling 12 is gripped by the coupling doors 66, the longitudinal axis of the pipe 14 is co-linear with the longitudinal axis of the coupling 12.

The use of two pipe doors 76 helps to distribute bearing pressure between the pipe 14 and the pipe slips 78 more evenly along the length of the pipe 14, thereby minimizing the potential for uneven deformation in the pipe 14. In addition, the use of pipe slips 78 allows the pipes 14 to be gripped using interfacial bearing pressure and frictional gripping forces uniformly around the pipe over the portion of the pipe 14 gripped by the pipe slips 78. Interfacial bearing pressure and frictional gripping force needed between the pipe slips 78 and the pipe 14 are calculated based on factors such as the pipe size, wall thickness, and steel grade so that the pipe 14 cannot slide inside the pipe slips 78 during the coupling/pipe make-up process. This is advantageous to some other known pipe gripping apparatuses that use other mechanisms, such as saw-toothed cutting teeth for biting into the outer surfaces of the pipe 14, because the pipe slips 78 avoid causing damage to localized places on the pipe surface. If desired, a gripping pad (such as, for example, screen sand paper) can be wrapped around the pipe 14 to increase the friction force between the pipe slips 78 and the pipe 14.

Two ram cylinders 84 are attached to the main frame 60. The ram cylinders 84 have the ram cylinder rods 86 attached to the traveling block assembly 64, so that as they retract or extend, they move the traveling block assembly 64 along the support beams 75 on the beam rollers 74. The ram cylinders 84 are aligned parallel to the axis of the coupling 12 and the pipe 14, so that as the ram cylinder rods 86 retract toward and extend away from the ram cylinders 84, the pipe 14 is moved toward and away from the coupling 12, respectively. In practice, the coupling 12 is gripped by the coupling doors and slips 66, 68, the pipe 14 is gripped by the pipe doors and slips 76, 78, and the ram cylinders 84 are activated to pull the traveling block assembly 64 toward the stationary block assembly 62 until the pipe 14 is forced into the coupling 12. By using a retractive force to pull the pipe 14 into the coupling 12, potential buckling of the ram cylinder rods 86 is minimized since the ram cylinder rods 86 are under tensile force instead of compressive force. A linear displacement transducer can be built into at least one of the ram cylinders 84 to monitor the pipe insertion depth more accurately compared to the traditional visual monitoring.

Additional components can be added to the field joining unit 58 to aid in guiding and joining the pipe 14 to the coupling 12. For example, a ladder 87, attached to the main frame 60, can be provided to provide operator access to the work area of the field joining unit 58. In addition, floor plates 89 can be provided so that an operator can access the assembly area to help the process, such as, for example, to guide the coupling 12 into the coupling doors 66, to position the spacer ring gasket (SRG) 16 inside the coupling 12, or to apply the epoxy coating to the outer surface of the end 20 of the pipe 14 or the inner surface of the coupling 12.

In addition, one pipe lift vee roller 91 can be installed on the traveling block assembly side of the field joining unit 58 to support the pipe 14 and coupling 12 make-up process by helping to raise or lower the pipe 14 or the pipe joints, and moving the pipe joints along the pipeline. The vee roller 91 can be attached to a lift shaft assembly 101 having a shaft 103 that can rotate either clockwise or counterclockwise inside pillow block bearings 105 and the split sleeve bearings 107, which are attached to the main frame 60. The lift shaft assembly 101 can be rotated by the pipe lift cylinders 112 having pipe lift cylinder rods 114 (best shown in FIG. 11A). The pipe lift cylinders 112 can be remotely actuated from the multi-station directional control valve with handlevers 69 mounted on the control panel 88. Also, the pipe lift cylinder pressure gauge 109 is mounted on the control panel 88 to monitor the hydraulic pressure in the pipe lift cylinders 112.

An additional pipe guide vee roller 97, installed between the pipe doors 76 and the coupling doors 66, can be provided to support and guide the pipe 14 as it is forced into the coupling 12. The pipe guide vee roller 97 can be raised and lowered by a pipe guide cylinder 115 having the pipe guide cylinder rod 116 attached to the pipe guide vee roller 97. The pipe guide cylinder 115 can be remotely actuated from the multi-station directional control valve with handlevers 69, which is mounted on the control panel 88. Furthermore, the upright rollers 99 with mounts 117 attached to the main frame 60, can be provided to guide the pipe 14 into the pipe doors 76 and also guide the pipe 14 or the pipe joints move longitudinally along the pipeline. In addition, a coupling support Vee roller 118 can be installed next to the coupling doors 66 and attached to the main frame 60 to support the coupling 12 when positioning the coupling 12 into the coupling doors 66.

In addition, another pipe lift vee roller 91 can be installed on the stationary block assembly side of the field joining unit 58 to raise the coupling 12 and guide the coupling 12 into the coupling doors 66, to support the pipe 14 and coupling 12 make-up process by helping to raise or lower the pipe 14 or the pipe joints, and moving the pipe joints along the pipeline. The vee roller 91 can be attached to a lift shaft assembly 101 having a shaft 103 that can rotate either clockwise or counterclockwise inside pillow block bearings 105 and the split sleeve bearings 107, which are attached to the main frame 60. The lift shaft assembly 101 can be rotated by the pipe lift cylinders 120 having pipe lift cylinder rods 121. The pipe lift cylinders 120 can be remotely actuated from the multi-station directional control valve with handlevers 69 mounted on the control panel 88. Also, the pipe lift cylinder pressure gauge 111 is mounted on the control panel 88 to monitor the hydraulic pressure in the pipe lift cylinders 120.

During operation of the field joining unit 58, some or all of the hydraulic cylinders can be remotely controlled from a control panel 88, which can be mounted to a cantilevered overhanging structure 90. The cantilevered overhanging structure 90 is attached to the main frame 60, and can include a lifting plate 92. The lifting plate 92 can be suspended by a pipelay sideboom tractor (not shown) or other piece of equipment via a lifting anchor shackle and a master link (not shown). In this way, the equipment can move the field joining unit 58 down the pipeline from one coupling/pipe insertion to the next.

Figure 10:
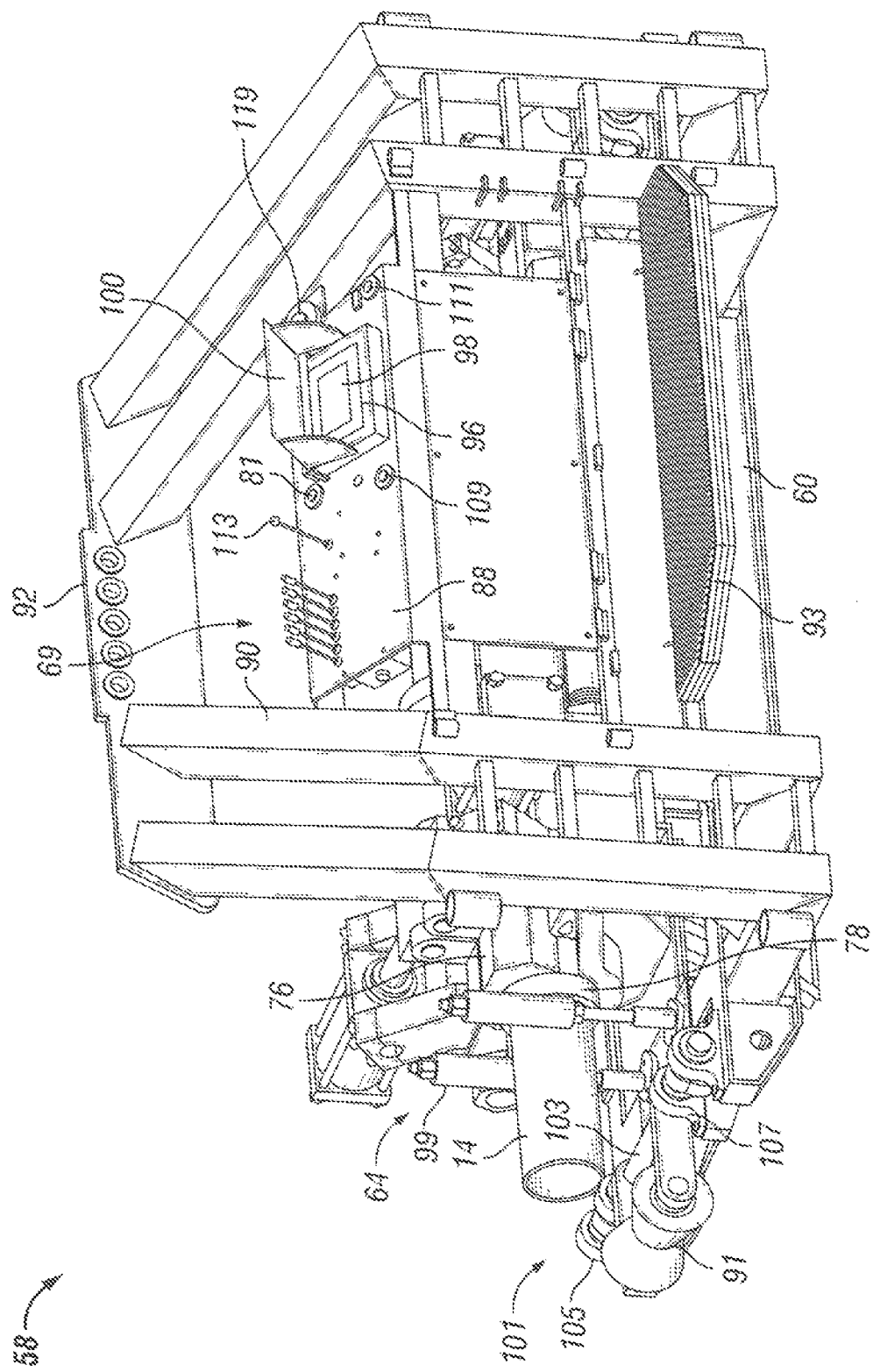
FIG. 10 is a front perspective view of the field joining unit shown in FIGS. 8A and 9 where the operator oversee the coupling/pipe make-up process.

FIG. 10 shows the control panel 88. As can be seen, the field joining unit 58 can include a multi-station directional control valve with handlevers 69 to remotely control the pipe door cylinders 80, the coupling door cylinders 70, the pipe lift cylinders 112, 120, and the pipe guide cylinder 115. The field joining unit 58 also includes a one-station directional control valve with a handlever 113 to control the movement of the ram cylinders 84. In addition, the field joining unit 58 can include pressure gauges 81 to monitor the pipe door cylinders 80 pressure, 109 to monitor the pipe lift cylinders' 112 pressure on the pipe door side, 111 to monitor the pipe lift cylinders' 120 pressure on the coupling door side, 119 to monitor the ram cylinders 84 differential pressure (between the piston chamber side and the rod chamber side), and 71 to monitor the coupling door cylinders 70 pressure (as shown, for example, in FIGS. 10 and 12). An operator platform 93 can also be mounted to the main frame 60 of the field joining unit 58 to allow easy and safe access to the control panel 88 by the operator.

The monitoring of the pressure in the pipe door cylinders 80 and the coupling door cylinders 70 allows an operator to more effectively prevent the pipe 14 and coupling 12 from undergoing plastic deformation or damage, and to ensure that enough bearing pressure is being generated to hold the pipe 14 and the coupling 12 in the pipe door slips 78 and coupling door slips 68 while the end 20 of the pipe 14 is being forced axially into the coupling 12 by the ram cylinders 84.

Also shown in FIG. 10 is a positive seal coupling installation data monitoring system (PSCIDMS) 96. The PSCIDMS 96 monitors, acquires, and saves data from the pressure transducers (not shown) in the hydraulic system of the field joining unit 58 and the linear displacement transducer built into the operator-side ram cylinder 84. The PSCIDMS 96 can also include a display 98, which can be a touch screen display, for displaying the data to an operator of the field joining unit 58. A hood 100 can be provided to protect the display 98, as well as to reduce glare on the display 98, making the display 98 easier for an operator to read.

One purpose of the PSCIDMS 96 is to provide a real-time graphic display of the coupling/pipe assembly 10 makeup process, especially to monitor the pipe insertion depth into the coupling. Another purpose is to generate a permanent record of operation parameters, such as, for example, net ram pressure vs. insertion depth, net ram axial load vs. insertion depth, pipe door pressure, coupling door pressure, and both target and actual insertion depth values. Optionally, all data can be transferred from PSCIDMS 96 to a USB drive and then be reviewed on a separate desktop computer. All data can also be copied and pasted directly to its respective Positive Seal Coupling (PSC) installation QA/QC forms.

Figure 14A:
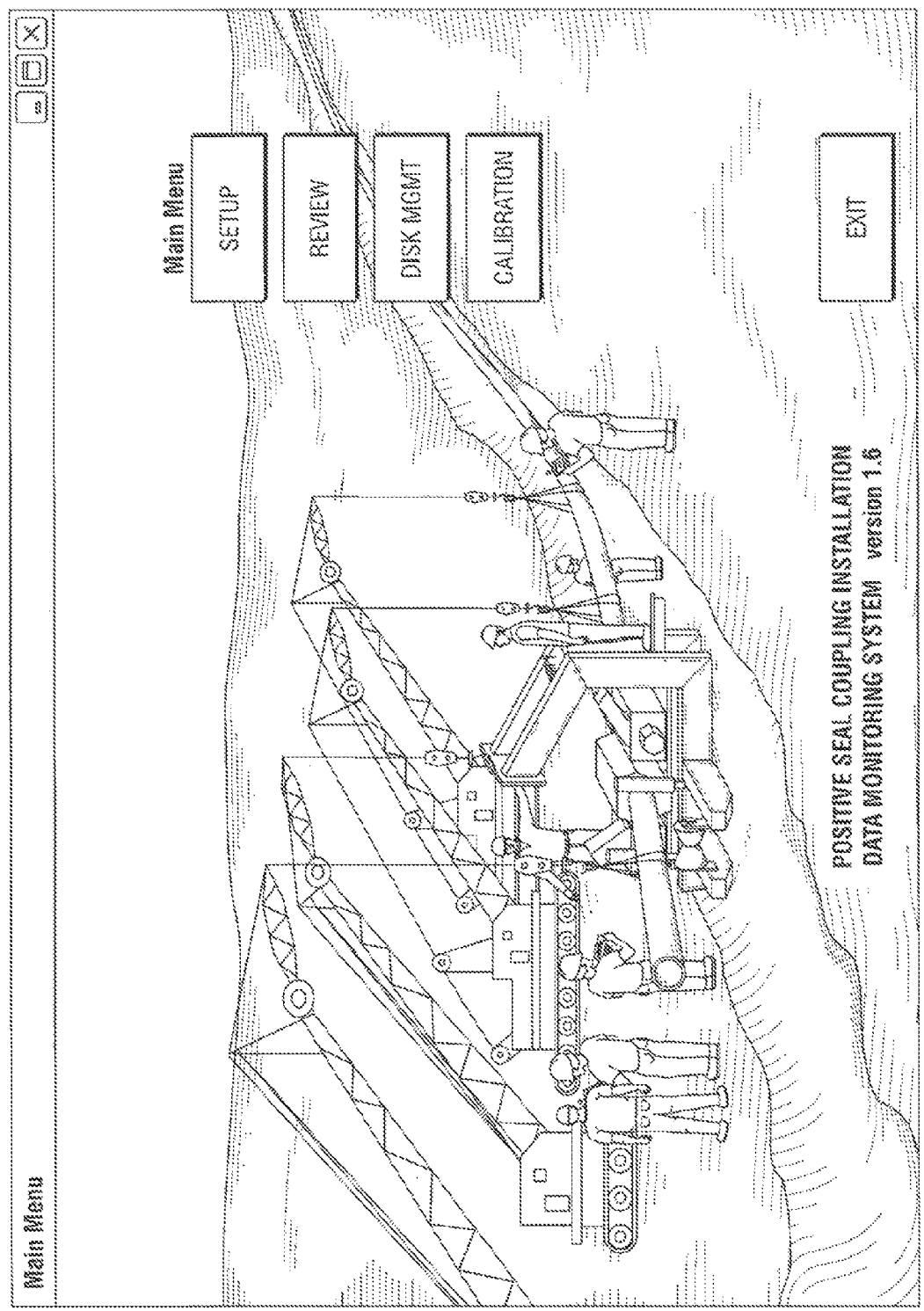
FIG. 14A is a screen shot of the main menu screen of the PSCIDMS software.

Sample screen shots of the information displayed on the display 98 of the PSCIDMS 96 are shown in FIGS. 14A-14G. FIG. 14A shows the main menu screen, which is the main navigation screen of the program. The following is the list of the main menu buttons: 1) SETUP, where setup information can be entered, 2) REVIEW, where data can be reviewed, 3) DISK MGMT, which allows an operator to specify data storage locations, 4) CALIBRATION, which allows for channel setup, and 5) EXIT, which allows an operator to close the PSCIDMS program.

FIG. 14B shows the SETUP screen. On this screen, the operator can enter the setup information for a particular positive seal coupling (PSC) installation, job number, project name, and/or pipeline name that is about to be assembled. The screen shown in FIG. 14B is completely filled out. Information can be entered into the fields by selecting a field, and then selecting the KEYBOARD button, which brings up a virtual keyboard. All the information entered will be automatically written into the fields for the next make-up. If there are make-ups for a particular job that have been done already, the operator can also retrieve setup information (i.e. Job No., Project Name, Pipeline Name, etc.) by clicking the READ SETUP button, thereby saving time and reducing the risk of errors.

All the information entered at the start of a particular job/project can be automatically carried over and written into the SETUP screen for the next make-up. Thus, except for a few data fields explained below, the operator may not need to re-enter data on the SETUP screen from one make-up to the next make-up. However, if desired, the operator can change any fields. The following is a list of fields the operator may need to fill: 1) Client Name & Representative, 2) Prime Contractor Name & Representative, 3) PSC Installation Company, 4) JU Operator, 5) Jetair Intl Installation Supervisor, 6) PSC Installation Co. Job No., 7) Project Name, 8) Pipeline Name, 9) Line Pipe Spec. NPS×Wall t (in. & mm)×API 5L Grade, 10) PSC DC No., 11) PSC Serial No., 12) PSC Length (PSC L), in., 13) PSC External Coating, 14) Flex Allowance (will initially be entered as 0.00 until sufficient Flex Allowance vs. Axial Load data has been developed from actual PSC make-up insertion depths), 14) SRG PN; 15) Pipeline MAOP, Min Hydrotest, Max Hydrotest, 16) Pipeline Installation (select the circle for either Above Grnd or Buried), 17) Line Pipe Coating (select the box for either Internal or External, or both boxes), 18) SRG Installed Check (select the box for Internal after confirming that SRG is installed), and 19) Comments (before or after PSC make-up the operator can enter any desired comments or notes).

After the SETUP screen is completed and verified, the operator can either navigate to the MONITORING Screen (FIG. 14C) by clicking the RUN button, or go back to the main menu screen by clicking the CANCEL button. Pressing the RUN button takes the operator directly to the MONITORING screen.

Figure 14C:
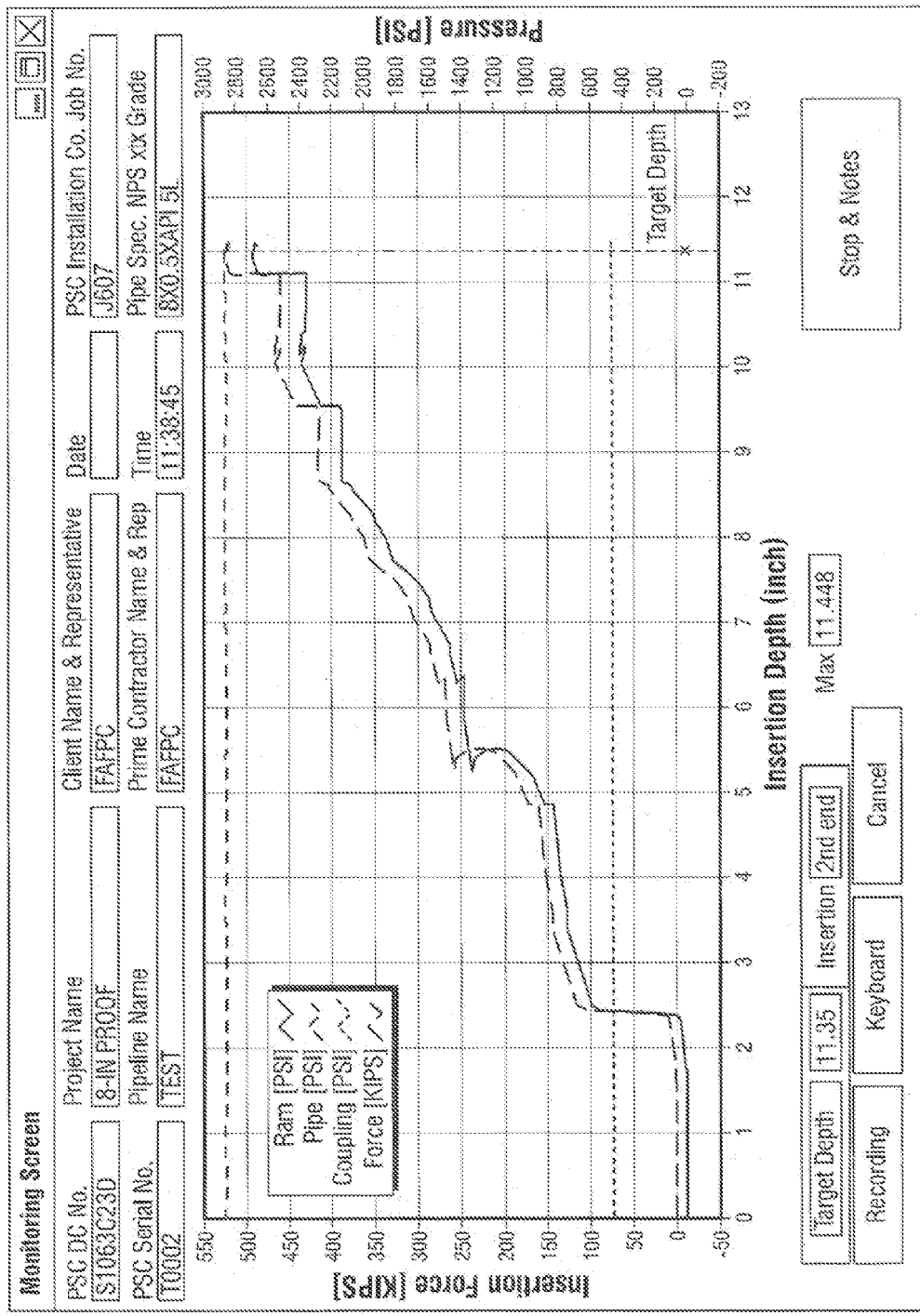
FIG. 14C is a MONITORING screen of the PSCIDMS software.

FIG. 14C shows the MONITORING Screen, in which the operator can view and monitor the following values during the PSC make-up process: the net Ram pressure verses displacement (insertion depth), the net Ram insertion force verses displacement, and Pipe/Coupling door cylinders pressures. As shown in FIG. 14C, Ram [PSI] is the white line showing the net Ram insertion pressure in PSI (graph right side Y axis vs. graph bottom displacement X axis in inches), Pipe [PSI] is the red line showing the Pipe door cylinders pressure in PSI (graph right side Y axis vs. graph bottom displacement X axis in inches), Coupling [PSI] is the green line showing the Coupling door cylinders pressure in PSI (graph right side Y axis vs. graph bottom displacement X axis in inches), and Force [KIPS] is the blue line showing the calculated net ram insertion force in 1,000s of pounds (kips) (graph left side Y axis vs. graph bottom displacement X axis in inches).

In addition to displaying a graph with the data output from the channels above, the key input data from the SETUP Screen are also shown on the top of the MONITORING screen, along with the Date and Time. (Note: the date and time are set on the PSCIDMS can be the same as on any PC with Windows installed. Exit the main menu screen to go to the Desktop screen and double click on the time at the bottom right.) The vertical Target Depth line is automatically calculated and entered on the graph by the program, based on the coupling's length which was previously entered on the Enter Setup Information screen.

Figure 14D:
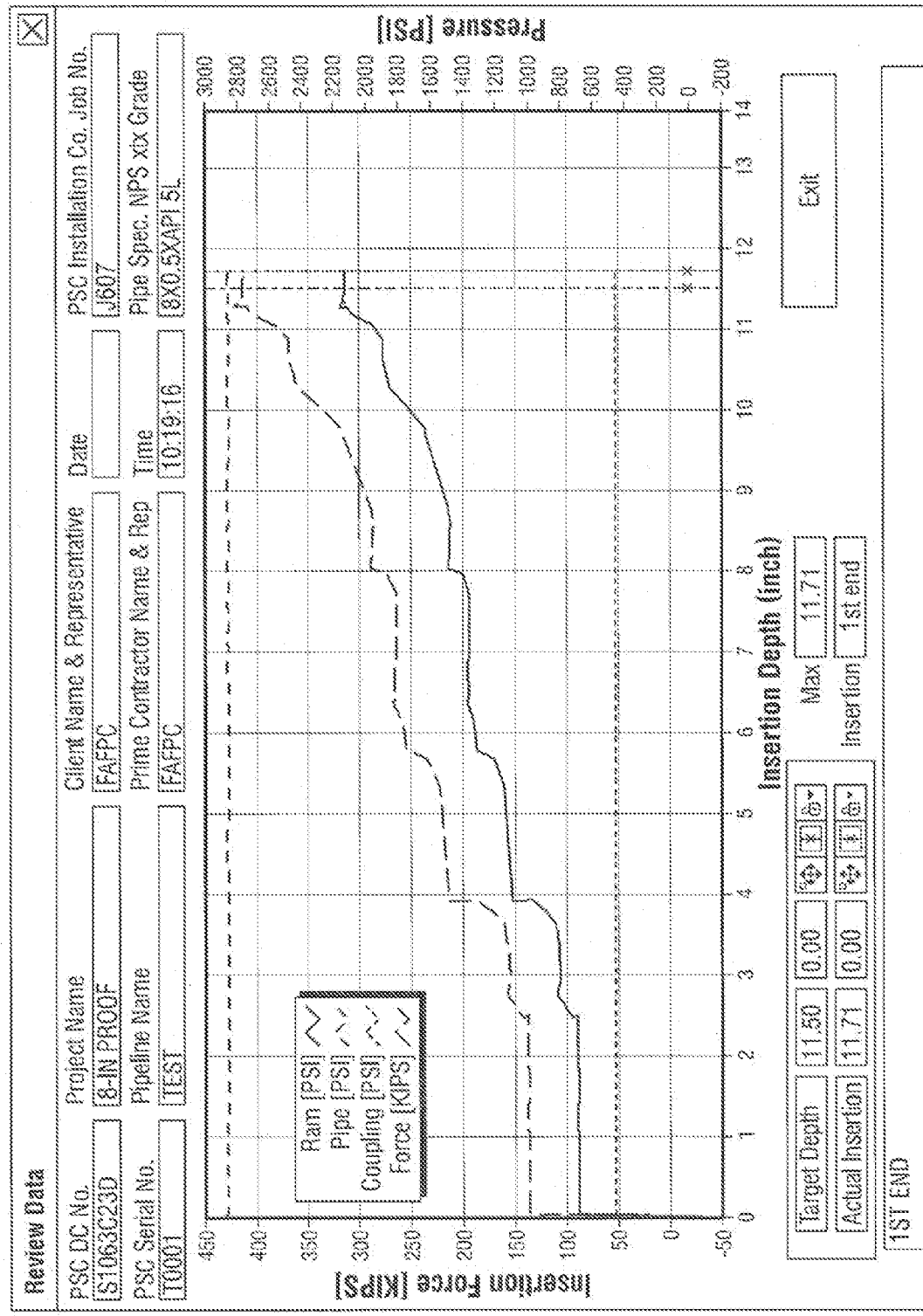
FIG. 14D is a REVIEW screen of the PSCIDMS software.

FIG. 14D shows REVIEW screen, which allows for previously recorded make-ups to be viewed graphically on site. Upon pressing the REVIEW button on the main menu screen, a box containing the text "Select a file to open" appears. The operator needs to navigate through the folder until the appropriate file is located. Pressing the EXIT button closes the graph and returns the operator to the main menu screen.

During the REVIEW process, the 'Pressure' scale is adjustable to allow an operator to zoom in. With the keyboard 'on screen', an operator can highlight the maximum pressure shown (3000 psi on FIG. 14D) and input a new maximum value. The scale will automatically adjust the pressure scale to the new maximum value. This scale adjustment can be done with the lower minimum pressure as well. In FIG. 14D, the vertical yellow line is the program generated 'Target Depth' (insertion depth), and the vertical red line is the 'Actual Insertion' (depth) from the Ram displacement transducer output.

Figure 14E:
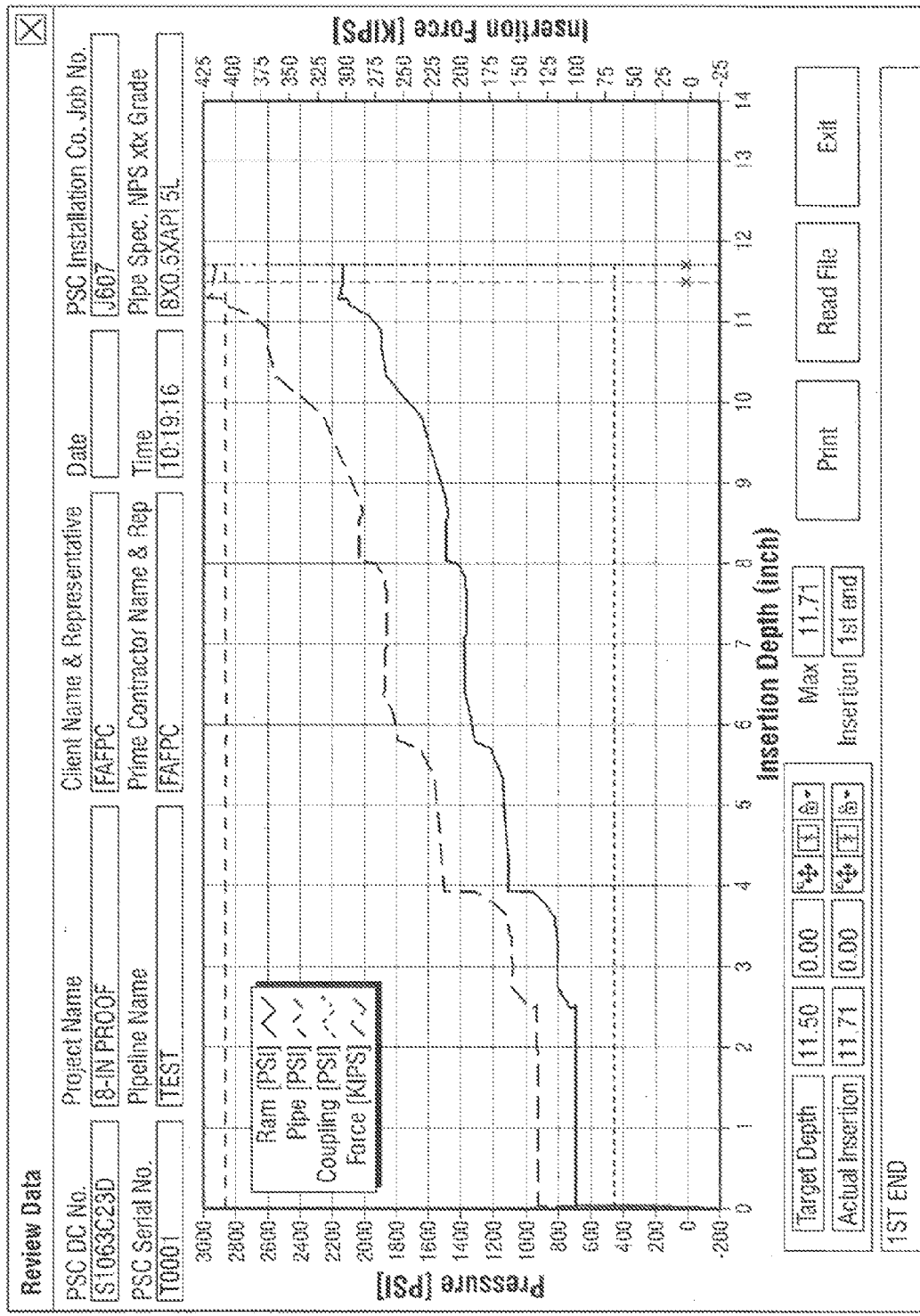
FIG. 14E is an alternate REVIEW screen of the PSCIDMS software.

FIG. 14E shows a separate REVIEW software that can be included on the PSCIDMS software package. This separate program must be installed on separate laptop or desktop computer(s). This separate 'Review Data' program works the same way as the REVIEW button on the Main Menu screen (from the Field Joining Unit 58) except that the 'Review Data' program has two more button on the screen, as shown in FIG. 14E. These two buttons are PRINT and READ FILE. In addition, the 'Review Data' window has a white background for easier printing.

As shown in the diagram of FIG. 14E, Insertion Force [KIPS] Y scale is on the right side of the screen and Pressure [PSI] Y scale is on the left side, which is also different from the Review Data screen (from the Field Joining Unit 58).

Figure 14F:
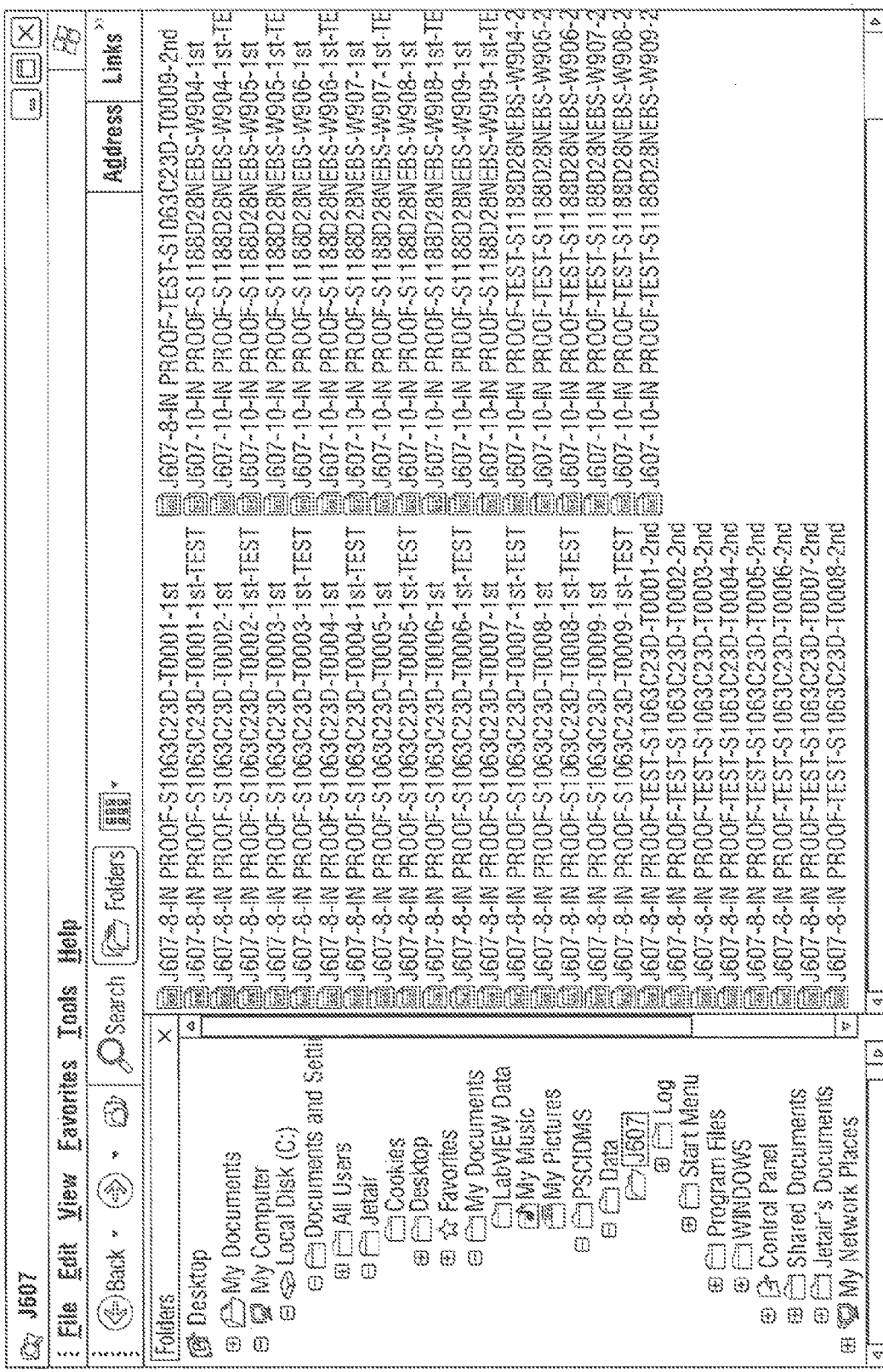
FIG. 14F is a DISK MGMT screen of the PSCIDMS software.

FIG. 14F shows a DISK MANAGEMENT screen that identifies the location of files stored in the PSCIDMS. The particular files shown in FIG. 14F are Excel (.xls) files. As can be seen, each Job No. folder in the Data folder contains all individual Make-up files in Excel (.xls) format just for that particular job, automatically generated by the program. The program will generate a Job No. folder once the first $1^{st}$ End Make-up for the job is completed. For example, as shown in FIG. 14E, Job No. folder J607 will be generated once the first $1^{st}$ End Make-up (i.e. J607-8-IN PROOF-S1063C230-T0001-$1^{st}$ shown on the right side) is completed. A Job No. folder can be comprised of one letter and three numbers, as. $1^{st}$ and $2^{nd}$ End Make-up Excel data files can automatically be saved to the Job No. folder.

Once all of the $1^{st}$ and $2^{nd}$ Ends Make-ups have been completed for a particular Job No., the operator can then transfer the Job No. folder to the USB drive. The DISK MGMT screen layout provides easy access to both the computer hard drive (C by default) and the USB drive to execute the Job No. folder transfer. Then, an operator can CUT and PASTE the Job No. folder from the USB drive to laptop or desktop computer(s) and CDs. These Make-up files can then be reviewed at any time on the separate computers using the 'Review Data' program.

FIG. 14G shows a CALIBRATION (Channel Setup) screen on which manufacturer specified values are shown, which values should be adjusted during re-calibration or replacing a transducer. Examples of correct calibration values are shown on the CALIBRATION screen as Calibrated at, Cal. Factor, Cal. Offset, and Cal. Gain. These values are automatically loaded into the computer upon PSCIDMS software installation. They are also saved in the 'Default Setup' file located in the SETUP folder under the PSCIDMS Programs Folder.

The operator, however, should check the pressure transducers' output when there is no hydraulic system pressure. The pressure transducers' output (Channel Names RAM, Pipe, Coupling, and RAM2) are shown in the far right 'Value' column of the CALIBRATION screen. In some examples, these Values should be checked before each start-up of the HPU, or at least each morning, so that there is zero pressure on the hydraulic system. If any 'Value' reading is greater than ±10.0 from 0.00, it can be reset to at or near zero by pressing the corresponding 'Cal. Offset' button shown in green and circled. After doing this 'reset' exercise, the transducers should be functioning properly and ready to begin recording data. Also, the LVDT (Linear Voltage Displacement Transducer installed inside of the operator-side Ram cylinder) channel 'Value' should not move or fluctuate until the Rams are actuated.

Although the technology herein has been described with reference to particular embodiments, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims.

What is claimed is:

1. An apparatus for assembling a positive seal coupling and a pipe, the apparatus comprising:
    a frame;
    a stationary block assembly attached to the frame and having coupling gripping doors controlled by coupling gripping doors cylinders
    a traveling block assembly slidably attached to the frame and having pipe gripping doors;
    two hydraulic ram cylinders attached to the frame and having ram cylinder rods attached to the traveling block assembly so that the hydraulic ram cylinders can move the traveling block assembly toward the stationary block assembly;
    the coupling gripping doors axially aligned with the pipe gripping doors so that when the hydraulic ram cylinders move the traveling block assembly toward the stationary block assembly, a pipe held by the pipe gripping doors is inserted into a coupling held by the coupling gripping doors;
    at least one pipe lift vee roller controlled by at least one pipe lift cylinder, and installed to at least one side of the stationary block assembly and the travelling block assembly;
    at least one pipe guide vee roller controlled by at least one pipe guide cylinder, and installed between the stationary block assembly and the travelling block assembly;
    pressure gauges in communication with the coupling door cylinders, the pipe door cylinders, the at least one pipe lift cylinder, and the at least one pipe guide cylinder, to sense pressure therein;
    pressure transducers in communication with the coupling door cylinders and the pipe gripping door cylinders to sense pressure therein;
    pressure transducers in communication with the hydraulic ram cylinders to sense a pressure difference therebetween; and
    a differential pressure gauge in communication with the hydraulic ram cylinders to sense the pressure difference therebetween.

2. The apparatus of claim 1, wherein the coupling gripping doors are controlled by coupling gripping door cylinders.

3. The apparatus of claim 2, wherein the pipe gripping doors are controlled by pipe gripping door cylinders.

4. The apparatus of claim 1, further comprising:
at least one pressure transducer in communication with at least one of the pipe door cylinders and the coupling door cylinders to sense pressure therein;
a linear displacement transducer in communication with at least one of said ram cylinder rods to sense linear displacement of the ram cylinder rod;
a data monitoring system connected to the at least one pressure transducer and the linear displacement transducer that receives information sensed by the at least one pressure transducer and the linear displacement transducer, and that generates a record of operational parameters; and
a display in communication with the data monitoring system to display information to an operator.

5. The apparatus of claim 1, further comprising:
coupling slips attached to the inside of the coupling gripping doors to help grip the coupling.

6. The apparatus of claim 1, further comprising:
pipe slips attached to the inside of the pipe gripping doors to help grip the pipe.

7. The apparatus of claim 1, further comprising:
roller support beams attached to the frame, and beam rollers attached to the traveling block assembly, wherein the beam rollers roll relative to the roller support beams as the travelling block assembly is moved by the hydraulic ram cylinders.

8. The apparatus of claim 1, wherein the pipe has a diameter of between about 2 inches and about 12 inches.

9. An apparatus for assembling a positive seal coupling and a pipe, the apparatus comprising:
a frame;
a coupling gripping assembly fixedly attached to the frame for gripping a coupling;
a pipe gripping assembly slidably attached to the frame for gripping a pipe;
a hydraulic ram cylinder having a ram cylinder rod and attached to the pipe gripping assembly for moving the pipe gripping assembly toward the coupling gripping assembly;
the coupling gripping assembly aligned with the pipe gripping assembly so that when the hydraulic ram cylinder moves the pipe gripping assembly toward the coupling gripping assembly, the pipe is inserted into the coupling; at least one pressure gauge in communication with at least one of the pipes or coupling gripping assemblies;
at least one pressure transducer in communication with at least one of the pipe or coupling gripping assemblies;
a linear displacement transducer in communication with the hydraulic ram cylinder to sense linear displacement of the ram cylinder rod;
a data monitoring system connected to the at least one pressure transducer and the linear displacement transducer for monitoring operational parameters.

10. The apparatus of claim 9, wherein the coupling gripping assembly further comprises:
coupling gripping doors that clamp around the coupling to prevent axial movement of the coupling relative to the coupling gripping assembly.

11. The apparatus of claim 10, wherein the pipe gripping assembly further comprises:
pipe gripping doors that clamp around the pipe to prevent axial movement of the pipe relative to the pipe gripping doors.

12. The apparatus of claim 11, wherein the coupling gripping doors include coupling slips attached to the inside of the coupling gripping doors to help grip the coupling, and the pipe gripping doors include pipe slips attached to the inside of the pipe gripping doors to help grip the pipe.

* * * * *